US011397329B2

(12) United States Patent
Jamali et al.

(10) Patent No.: US 11,397,329 B2
(45) Date of Patent: Jul. 26, 2022

(54) PANCAKE LENS ASSEMBLY AND OPTICAL SYSTEM THEREOF

(71) Applicant: Facebook Technologies, LLC, Menlo Park, CA (US)

(72) Inventors: Afsoon Jamali, Menlo Park, CA (US); Brian Wheelwright, Menlo Park, CA (US); Yang Zhao, Menlo Park, CA (US); Yusufu Njoni Bamaxam Sulai, Menlo Park, CA (US); Douglas Robert Lanman, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 347 days.

(21) Appl. No.: 16/548,800

(22) Filed: Aug. 22, 2019

(65) Prior Publication Data
US 2020/0348528 A1 Nov. 5, 2020

Related U.S. Application Data

(63) Continuation of application No. 16/403,140, filed on May 3, 2019.

(51) Int. Cl.
*G02B 27/09* (2006.01)
*G02B 7/04* (2021.01)
(Continued)

(52) U.S. Cl.
CPC ........... *G02B 27/0955* (2013.01); *G02B 7/04* (2013.01); *G02B 27/0172* (2013.01);
(Continued)

(58) Field of Classification Search
CPC ............. G02B 27/0955; G02B 27/0172; G02B 27/28; G02B 7/04; G02B 2027/0118; G02B 2027/0159; G02F 1/133536
(Continued)

(56) References Cited

U.S. PATENT DOCUMENTS 10,379,419 B1 * 8/2019 Lu ................. G02B 27/286
2007/0127348 A1 6/2007 Ooi et al.
(Continued)

OTHER PUBLICATIONS

International Search Report and Written Opinion dated Jul. 17, 2020, in International Application No. PCT/US2020/028426, filed on Apr. 16, 2020 (12 pages).
(Continued)

*Primary Examiner* — Marin Pichler
*Assistant Examiner* — Mitchell T Oestreich
(74) *Attorney, Agent, or Firm* — Millburn IP PLLC

(57) ABSTRACT

An optical lens assembly and a head-mounted display (HMD) is provided. The optical lens assembly includes a first optical element including a partial reflector and a quarter-wave plate, a second optical element including a reflective polarizer, and a varifocal lens disposed inside a cavity formed by the first optical element and the second optical element. The varifocal lens is a liquid crystal (LC) lens stack including a plurality of LC lenses. An LC lens of the plurality of the LC lenses has a plurality of optical states including an additive state that adds optical power to the varifocal lens and a subtractive state that removes optical power from the varifocal lens. The plurality of optical states provides a range of adjustment of optical power for the optical lens assembly.

15 Claims, 19 Drawing Sheets

(51) Int. Cl.
  *G02B 27/28* (2006.01)
  *G02F 1/1335* (2006.01)
  *G02B 27/01* (2006.01)
(52) U.S. Cl.
  CPC ....... *G02B 27/28* (2013.01); *G02F 1/133536* (2013.01); *G02B 2027/0118* (2013.01); *G02B 2027/0159* (2013.01)
(58) Field of Classification Search
  USPC .......................................................... 359/754
  See application file for complete search history.

(56) References Cited

U.S. PATENT DOCUMENTS

| | | | |
|---|---|---|---|
| 2009/0174918 A1* | 7/2009 | Zhuang | G02B 5/32 359/19 |
| 2017/0358136 A1 | 12/2017 | Gollier et al. | |
| 2018/0284464 A1* | 10/2018 | Lu | G02B 27/14 |

OTHER PUBLICATIONS

Jamali, A., et. al. "Design of Large Aperture Tunable Refractive Fresnel Liquid Crystal Lens," Applied Optics, 57(7): B10, Mar. 2018, also available at URL: https://www.researchgate.net/publication/320630387_Design_of_a_large_aperture_tunable_refractive_Fresnel_liquid_crystal_lens, retrieved on Dec. 5, 2018, 11 pages.

* cited by examiner

PANCAKE LENS ASSEMBLY AND OPTICAL SYSTEM THEREOF

CROSS-REFERENCES TO RELATED APPLICATIONS

This application is a continuation application of US patent application No. U.S. Ser. No. 16/403,140, entitled "PANCAKE LENS ASSEMBLY AND OPTICAL SYSTEM THEREOF", filed on May 3, 2019.

BACKGROUND

Head-Mounted Display (HMD) has been widely used in, e.g., video playback, gaming, and sports. One major application of HMD is to realize at least one of virtual reality (VR), augmented reality (AR), or mixed reality (MR). An HMD is highly desired to be compact and light weight, and have high resolution, large field of view (FOV), and small form factors. An HMD generally has a display element configured to generate image light that passes through a lens system to reach a user's eyes. The lens system includes multiple optical elements, such as lenses, waveplates, reflectors, etc., for focusing the image light to the user's eyes. To achieve a compact size and light weight but maintain good optical characteristics, an HMD often uses a pancake lens in the lens system.

Further, current VR/AR/MR HMDs are often having the so-called vergence-accommodation conflict, where a stereoscopic image pair drives the vergence state of a user's human visual system to arbitrary distances, but the accommodation or focusing state of the user's eyes is optically driven towards a fixed distance. The vergence-accommodation conflict causes eye strain or headaches during prolonged VR/AR/MR sessions, significantly degrading the visual experience of the users. The disclosed pancake lens assembly and optical system thereof are directed to solve one or more problems set forth above and other problems.

BRIEF SUMMARY OF THE DISCLOSURE

One aspect of the present disclosure provides an optical lens assembly. The optical lens assembly includes a first optical element including a partial reflector and a quarter-wave plate, a second optical element including a reflective polarizer, and a varifocal lens disposed inside a cavity formed by the first optical element and the second optical element. The varifocal lens is a liquid crystal (LC) lens stack including a plurality of LC lenses. An LC lens of the plurality of the LC lenses has a plurality of optical states including an additive state that adds optical power to the varifocal lens and a subtractive state that removes optical power from the varifocal lens. The plurality of optical states provides a range of adjustment of optical power for the optical lens assembly.

Another aspect of the present disclosure provides a head-mounted display (HMD). The HMD includes an optical lens assembly that receives an image light from an electronic display and directs the image light to an eye-box. The optical lens assembly includes a first optical element including a partial reflector and a quarter-wave plate, a second optical element including a reflective polarizer, and a varifocal lens disposed inside a cavity formed by the first optical element and the second optical element. The varifocal lens is a liquid crystal (LC) lens stack including a plurality of LC lenses. An LC lens of the plurality of the LC lenses has a plurality of optical states including an additive state that adds optical power to the varifocal lens and a subtractive state that removes optical power from the varifocal lens. The plurality of optical states provides a range of adjustment of optical power for the optical lens assembly.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
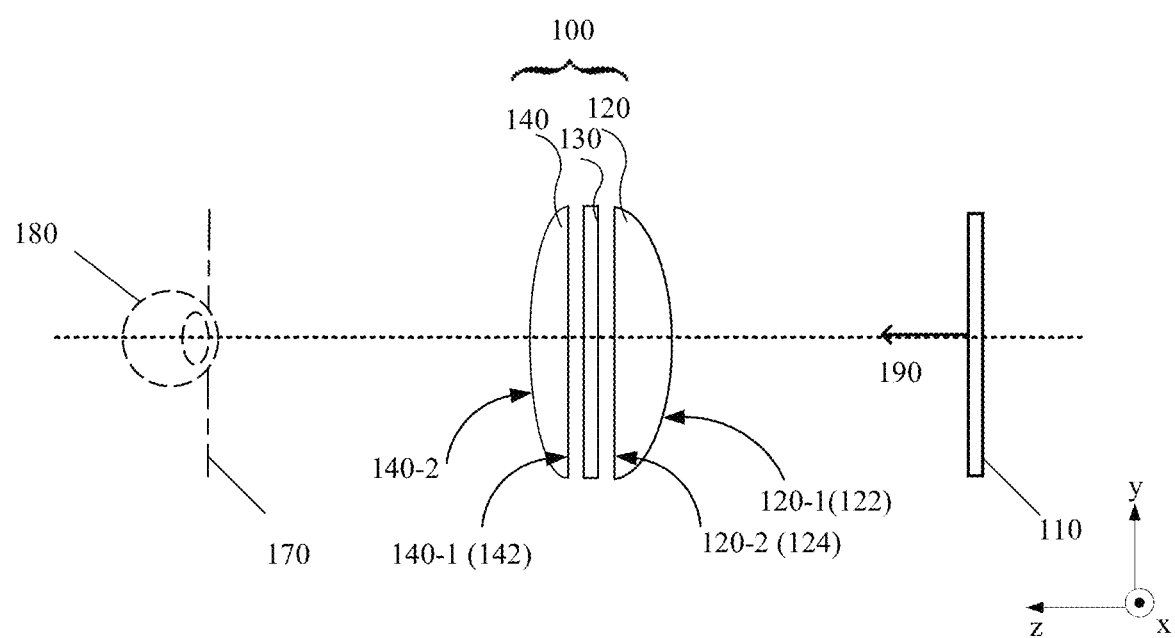
FIG. 1 illustrates a schematic diagram of a pancake lens assembly according to an embodiment of the disclosure.

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a pancake lens assembly, which is capable of folding the optical path and solving vergence-accommodation conflict in head-mounted displays (HMDs). The pancake lens assembly may include a first optical element including a partial reflector and a quarter-wave plate and a second optical element including a reflective polarizer. The first optical element and the second optical element may form a cavity. The pancake lens assembly may further include a varifocal lens having an adjustable optical power. In some embodiments, the varifocal lens may be disposed inside the cavity. In some embodiments, the varifocal lens may be disposed outside the cavity. The varifocal lens may enable the pancake lens assembly to be a variable pancake lens assembly.

FIG. 1 illustrates a schematic diagram of a pancake lens assembly 100 according to an embodiment of the disclosure. The pancake lens assembly 100 may be used in an optical system to fold the optical path from a light source to a detector. For example, the pancake lens assembly 100 may be used in a head-mounted display (HMD), to fold the optical path, thereby reducing the back focal distance in the HMD. As shown in FIG. 1, the pancake lens assembly 100 may focus light 190 from an electronic display 110 to an eye-box located at an exit pupil 170. Hereinafter, the light 190 emitted by the electronic display 110 for forming images is also referred to as "image light." The exit pupil 170 may be at a location where an eye 180 is positioned in an eye-box region when a user wears the HMD.

The pancake lens assembly 100 may include a first optical element 120, a varifocal lens 130, a second optical element 140. The first optical element 120 and the second optical element 140 may form a cavity, and the varifocal lens 130 may be disposed inside or outside the cavity. For illustrative purposes, FIG. 1 shows the varifocal lens 130 may be disposed inside the cavity formed by the first optical element 120 and the second optical element 140. In some embodiments, the first optical element 120, the varifocal lens 130 and the second optical element 140 may be coupled together by an adhesive. The first optical element 120 and/or the second optical element 140 may include one or more optical lenses. In some embodiments, the first optical element 120 may include a first surface 120-1 configured to receive the image light from the electronic display 110 and an opposing second surface 120-2 configured to output altered image light. The first optical element 120 may further include a mirrored surface 122 and a waveplate surface 124, which are separate layers or coatings bonded to or formed on the first optical element 120. In some embodiments, the waveplate surface 124 may be bonded to or formed on the second surface 120-2 of the first optical element 120, and the mirrored surface 122 may be bonded to or formed on the first surface 120-1 of the first optical element 120.

The mirrored surface 122 may include a partial reflector that is partially reflective to reflect a portion of the received light. In some embodiments, the mirrored surface 122 may be configured to transmit about 50% of incident light and reflect about 50% of the incident light. Such a mirrored surface is often referred to as a 50/50 mirror. In some embodiments, the waveplate surface 124 may include a quarter-wave plate (QWP) that alters the polarization of received light. A quarter-wave plate includes a polarization axis, and the polarization axis of the QWP may be oriented relative to incident linearly polarized light to convert the linearly polarized light into circularly polarized light or vice versa for a visible spectrum and/or infrared spectrum. In some embodiments, for an achromatic design, the quarter-wave plate may include a multilayer birefringent material (e.g., polymer or liquid crystals) to produce quarter wave birefringence across a wide spectral range. In some embodiments, for a simple monochrome design, an angle between the polarization axis (i.e., fast axis) of the quarter-wave plate and incident linearly polarized light may be approximately 45 degrees.

The second optical element 140 may have a first surface 140-1 facing the varifocal lens 130 and an opposing second surface 140-2. The second optical element 140 may include a reflective polarizer surface 142, which is a separate layer or coating bonded to or formed on the second optical element 140. In some embodiments, the reflective polarizer surface 142 may be bonded to or formed on the first surface 140-1 of the second optical element 140. The reflective polarizer surface 142 may include a partially reflective mirror configured to reflect a received light of a first linear polarization and transmit a received light of a second linear polarization. For example, the reflective polarizer surface 142 may reflect light polarized in a blocking direction (e.g., x-axis direction), and transmit light polarized in an orthogonal direction (e.g., y-axis direction). In the disclosed embodiments, the blocking direction is referred to as a direction of a blocking axis or a blocking axis direction of the reflective polarizer surface 142, and the perpendicular direction is referred to as a direction of a transmission axis or a transmission axis direction of the reflective polarizer surface 142.

The varifocal lens 130 may have a variable focal length, for example, an adjustable optical power. The varifocal lens 130 may include any suitable lenses, such as a glass lens, a polymer lens, a liquid lens, a liquid crystal (LC) lens, or some combination thereof. The varifocal lens 130 may adjust an orientation of light emitted from the electronic display 110, such that the light emitted from the electronic display 110 appears at particular focal distances/image planes from the user. In some embodiments, the varifocal lens 130 may include an LC lens 130, which is capable of adjusting the optical power sufficiently fast to keep pace with eye accommodation (e.g., accommodation occurs in around 300 ms), such that the vergence-accommodation conflict in the HMD can be resolved.

The pancake lens assembly 100 shown in FIG. 1 is merely for illustrative purposes. In some embodiments, one or more of the first surface 120-1 and the second surface 120-2 of the first optical element 120 and the first surface 140-1 and the second surface 140-2 of the second optical element 140 may be curved surface(s). In some embodiments, the pancake lens assembly 100 consistent with the disclosure can have one optical element or more than two optical elements. In some embodiments, the pancake lens assembly 100 may further include other optical elements arranged between the electronic display 110 and the eye 180, such as a linear polarizer, a quarter-wave plate, which is not limited by the present disclosure.

In some embodiments, the LC lens 130 may have a Fresnel structure, i.e., a Fresnel LC lens. The Fresnel LC lens may include any appropriate type of Fresnel structure, such as a Fresnel zone plate lens including areas that have a phase difference of a half-wave to adjacent areas, a diffractive Fresnel lens having a segmented parabolic phase profile where the segments are small and can result in significant diffraction, or a refractive Fresnel lens having a segmented parabolic profile where the segments are large enough so that diffraction effects are minimized. Other structures may also be used. In some embodiments, the varifocal lens 130 may include a refractive Fresnel LC lens having a segmented parabolic profile, where the segments are large enough such that the diffraction angle is smaller than the angular resolution of human eyes, i.e., diffraction effects are not observable by human eyes. Such a refractive Fresnel LC lens is referred to as a segmented phase profile (SPP) LC lens.

Figure 2:
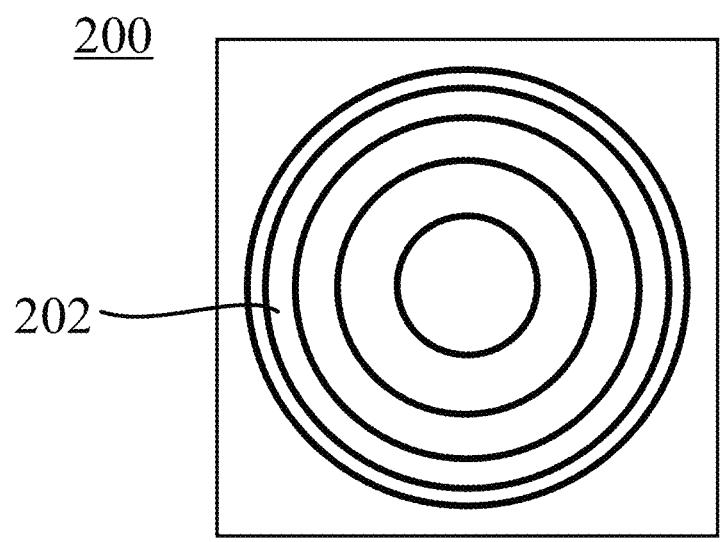
FIG. 2 illustrate a schematic diagram of a segmented phase profile (SPP) liquid crystal (LC) lens according to an embodiment of the disclosure.

FIG. 2 illustrate a schematic diagram of an SPP LC lens 200 according to an embodiment of the disclosure. As shown in FIG. 2, the Fresnel structure of the SPP LC lens 200 is represented by a plurality of concentric ring-shaped zones 202 of increasing radii, which are referred as Fresnel segments or Fresnel resets. For a positive thin lens, optical path difference ("OPD") is approximated with Maclaurin series to a parabolic profile as shown in Equation (1)

$$OPD(r) = \frac{-r^2}{2f},\qquad(1)$$

where r is the lens radius (i.e., half of the lens aperture) and f is the focal length. The OPD of an LC lens is proportional to the cell thickness d and the birefringence $\Delta n$ of the LC material as shown in Equation (2)

$$OPD = d*\Delta n,\qquad(2)$$

The response time $\tau$ of an Electrically Controlled Birefringence (ECB) LC cell, which is the time the material requires to recover to its original state, is quadratically dependent on cell thickness d ($\tau \propto d^2$) as shown in Equation (3)

$$\tau = \frac{\gamma \times d^2}{K_{11} \times \pi^2},\qquad(3)$$

where $\gamma$ and $K_{11}$ are the rotational viscosity and the splay elastic constant of the LC material, respectively. Equations (1)-(3) show there is a tradeoff between the aperture size and response time, and thus designing an LC lens with large aperture and reasonable response time is an uphill task. In the disclosed embodiments, though introducing phase resets in the parabolic phase profile, e.g., using a SPP LC lens, a large aperture size of the LC lens may be allowed without compromising the response time.

Figure 3A:
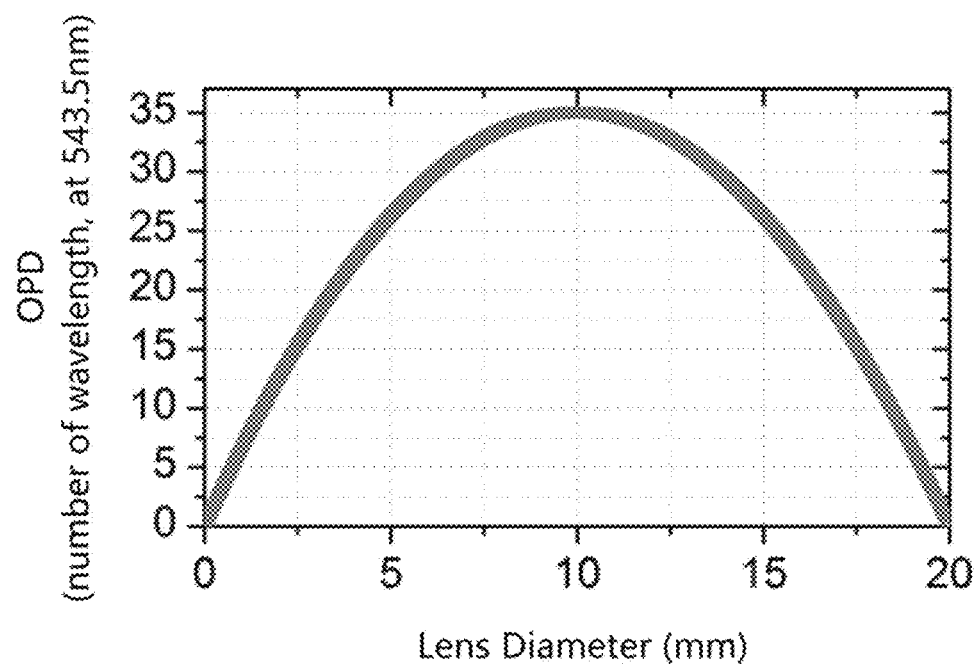
FIG. 3A illustrates a phase profile of an LC lens that does not include any phase resets.
Figure 3B:
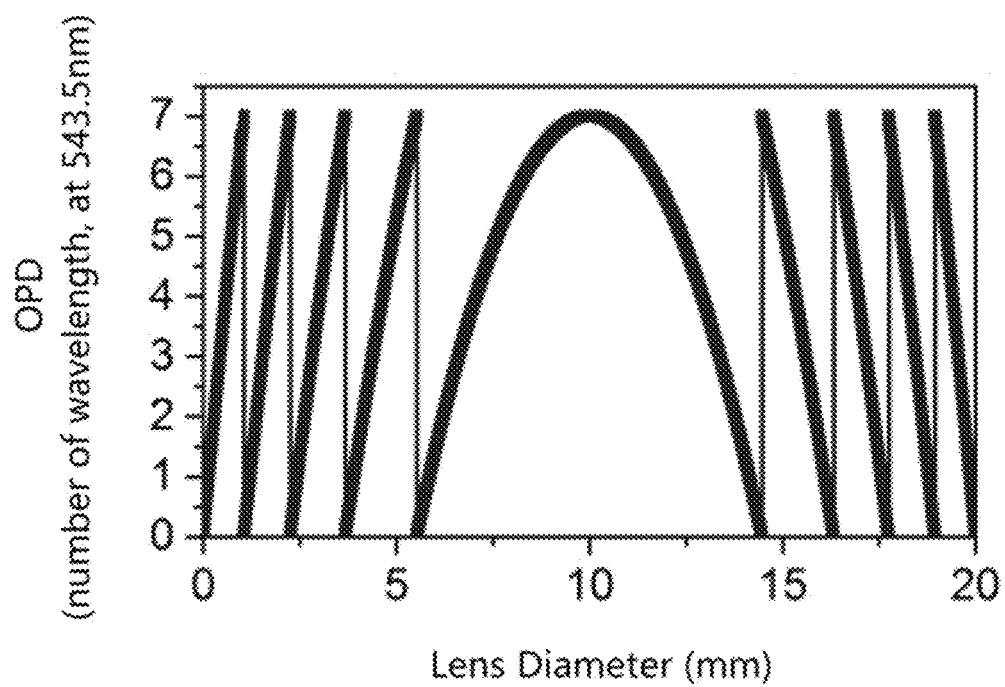
FIG. 3B illustrates a phase profile of an SPP LC lens according to an embodiment of the disclosure.

FIG. 3A illustrates a desired phase profile for ±0.375 Diopter (D) LC lens that does not include any phase resets, where the OPD equals to 35λ. The aperture of the LC lens is 20 mm, and the thickness of the LC cell is about 70 μm for LC materials with a birefringence $\Delta n$ of 0.27. To decrease the effective thickness of the LC cell, resets or segments may be introduced into the lens phase profile. FIG. 3B illustrates 2D phase map of the SPP LC lens 200 that includes 5 resets, where the thickness of the LC cell would be reduced up to 5 times and, accordingly, the response time would be improved by a factor of 25. That is, through introducing the segments in the lens phase profile, the optical power of the SPP LC lens 200 may be adjusted sufficiently fast to keep pace with eye accommodation (e.g., accommodation occurs in around 300 ms), such that the vergence-accommodation conflict would be resolved.

The number of the resets may be determined based on specific configurations of the Fresnel structure and the SPP LC lens 200 requirements, such as the desired optical power, lens aperture, switching time, image quality of the LC lens. A large number of phase steps within one wavelength of OPD (i.e., per wavelength) may be desired for accurate representation of phase profile. Meanwhile, to configure the SPP LC lens with negligible diffraction angle for near eye applications, the minimum width of the Fresnel segments (i.e., the minimum Fresnel segment width) of the SPP LC lens 200 is desired to be larger than about 1 mm for green light having a wavelength of 543.5 nm.

Figure 4A:
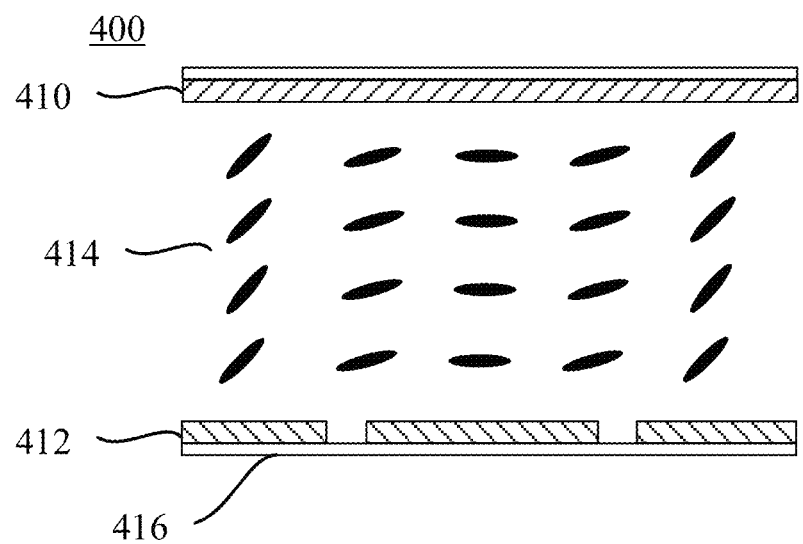
FIG. 4A illustrates a schematic diagram of an SPP LC lens according to an embodiment of the disclosure.

FIG. 4A illustrates a schematic diagram of an SPP LC lens 400 according to an embodiment of the disclosure. The SPP LC lens 400 may be the SPP LC lens 200 in FIG. 2. As shown in FIG. 4A, the SPP LC lens 400 may include a plurality of first electrodes 412, one or more second electrode 410, a liquid crystal (LC) layer 414, and substrates 416. The substrates 416 may be substantially transparent in the visible band (~380 nm to 750 nm). In certain embodiments, the substrates 416 may also be transparent in some or all of the infrared (IR) band (~750 nm to 1 mm). The substrate layers may be composed of, e.g., $SiO_2$, plastic, sapphire, etc. The first electrodes 412 and second electrodes 410 may be transparent electrodes (e.g., indium tin oxide electrodes) disposed on the substrates 416 to generate electric fields, which reorients the LC molecules in the LC layer 414 to form a lens having a desired phase profile.

In some embodiments, the first electrodes 412 may include discrete ring-shaped electrodes corresponding to the Fresnel structures in the SPP LC lens 400, and the ring-shaped electrodes may be concentric with identical area. With this electrode geometry, when the phase difference between adjacent first electrodes 412 is the same, a parabolic phase profile may be obtained. If the phase is proportional to the applied voltage, a linear change in the voltage across the first electrodes 412 (same difference in voltage between any two first electrodes 412) may yield a desired parabolic phase profile.

Figure 4B:
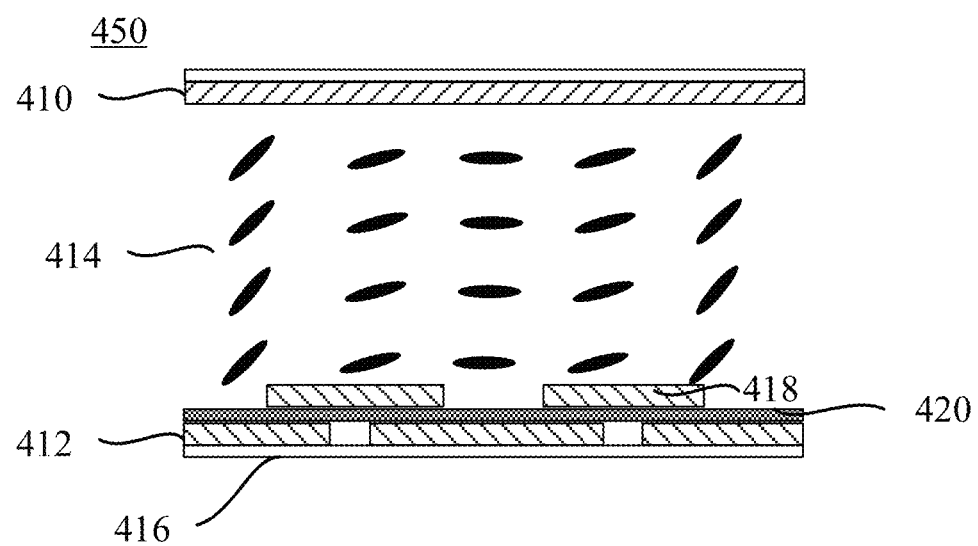
FIG. 4B illustrates a schematic diagram of an SPP LC lens having floating electrodes according to an embodiment of the disclosure.

In some embodiments, the gaps between the first electrodes 412 can cause scattering and thus image degradation. To address that image degradation, a plurality of floating electrodes may be introduced. FIG. 4B illustrates a schematic diagram of an SPP LC lens 450 having floating electrodes according to an embodiment of the disclosure. As shown in FIG. 4B, a plurality of floating electrodes 418 may be disposed on the substrate 416 having the first electrodes 412. The floating electrodes 418 may include discrete and concentric ring electrodes which are not driven by ohmic connection but are capacitively coupled to the first electrodes 412. The floating electrodes 418 may be configured to cover half of the area of each of neighboring first electrodes 412. An insulating layer 420 may be disposed between the floating electrodes 418 and the first electrodes 412 to achieve the electrical insulation.

Figure 5:
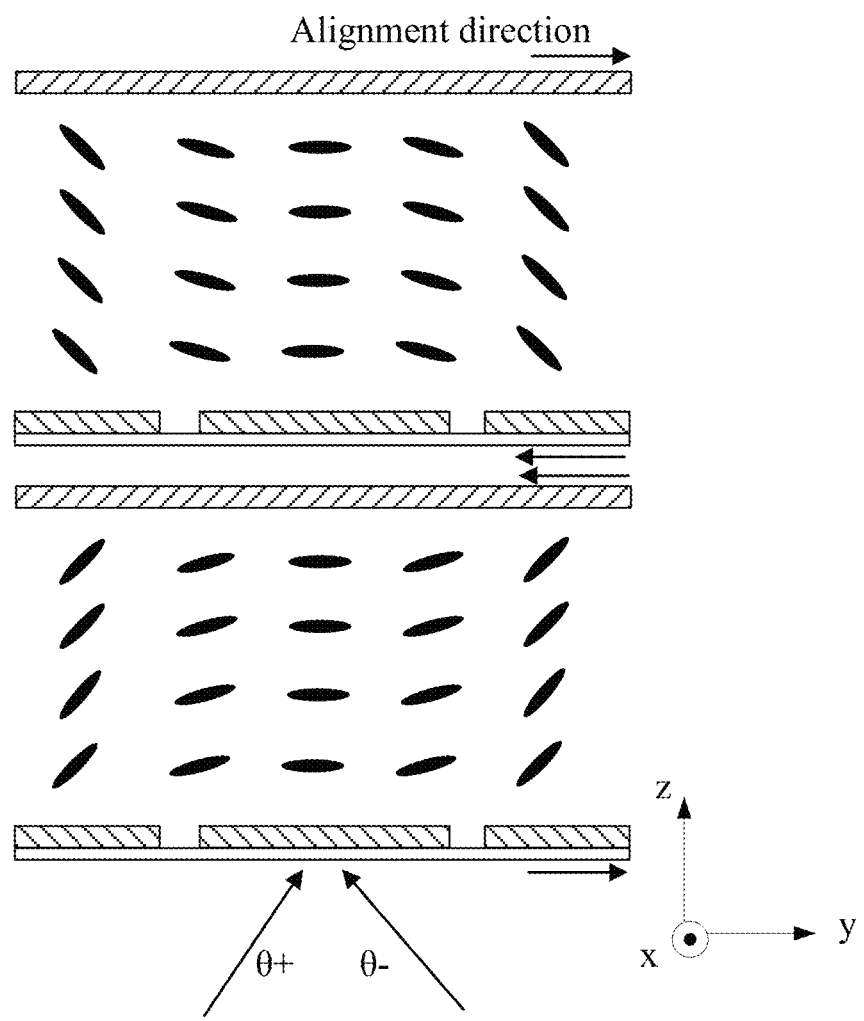
FIG. 5 illustrates a schematic diagram of an SPP LC lens stack according to an embodiment of the disclosure.

To further improve the response time of the SPP LC lens, in some embodiments, multiple SPP LC lens (e.g., multiple lens layers) may be optically coupled to form a stack of SPP LC lens, i.e., an SPP LC lens stack, such that given a same tunable optical power range, the thickness of each SPP LC lens may be reduced and, accordingly, the response of each SPP LC lens may be reduced. FIG. 5 illustrates a schematic diagram of an SPP LC lens stack 500 according to an embodiment of the disclosure. For illustrative purposes, FIG. 5 shows a pair of SPP LC lenses may be optically coupled to form the SPP LC lens stack 500. Provided that each SPP LC lens has 5 resets in the phase profile, considering the effect of the pair of lenses and the Fresnel resets, the thickness of the LC cell may be reduced up to 10 times (5 resets×2) and, accordingly, the response speed may be improved by a factor of 100. Moreover, the two SPP LC lenses may have opposite alignment directions (e.g., rubbing directions) on the corresponding LC surfaces of the two SPP LC lens, so as to improve the viewing angle. That is, for viewing angle improvement, two of SPP LC lenses with the same configuration but opposite rubbing directions may be optically coupled.

In addition, the polarization insensitivity is also very important for HMDs for AR applications. Most LC materials are birefringent and, thus, are polarization sensitive. When the light propagating in a direction parallel to the LC director is incident onto the LC cell, the light will experience ordinary refractive index $n_o$ of the LC material for any polarization states. However, when the light propagating in a direction perpendicular to the LC director is incident onto the LC cell, the light will experience refractive index between the ordinary refractive index $n_o$ and extraordinary refractive index $n_e$ of the LC material, depending on the polarization state of light.

Cholesteric LC materials can be made polarization insensitive as discussed by Clarke et al. in Electro-active lens U.S. Pat. No. 7,728,949B2. In this case the pitch of cholesteric LCs can be made in the range of the wavelength of incident light and, therefore, when no voltage is applied to the LC cell, the light will experience an average refractive index $$\left(\frac{n_o + n_e}{2}\right)$$

for any polarization states of light. For nematic LCs, the SPP LC lenses may be configured to be polarization insensitive by optically coupling cells of orthogonal polarization, in which each cell may focus one polarization state of light, for example, one cell focuses s polarization and the other focuses p polarization.

Figure 6A:
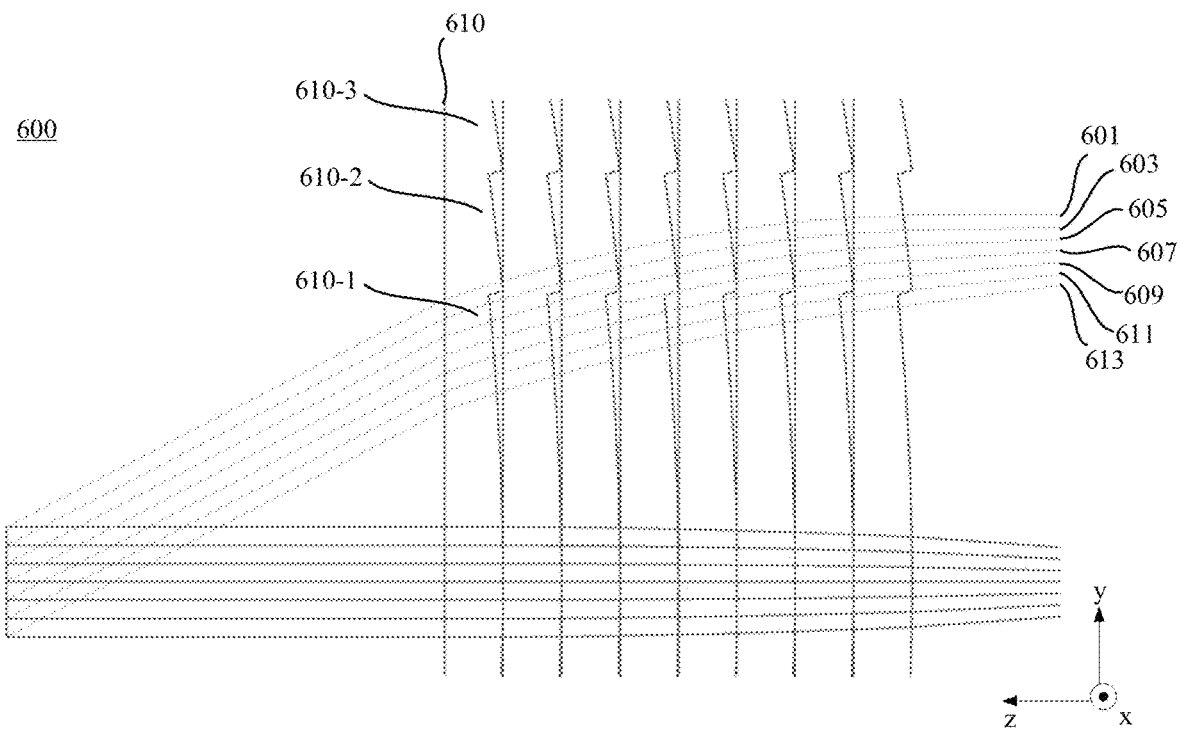
FIG. 6A illustrates a schematic diagram of an SPP LC lens stack without Fresnel resets offset according to an embodiment of the disclosure.

FIG. 6A illustrates a schematic diagram of an SPP LC lens stack 600 without Fresnel resets offset according to an embodiment of the disclosure. As shown in FIG. 6A, the SPP LC lens stack 600 may include a plurality of SPP LC lenses or SPP LC lens layers 610 stacked in a z-direction. Each SPP LC lens 610 may have a Fresnel structure including a plurality of concentric ring-shaped zones of increasing radii. Each SPP LC lens 610 may have a same configuration of the concentric ring-shaped zones or Fresnel resets, for example, the radius of the corresponding ring-shaped zones in the SPP LC lenses 610 may be the same. For illustrative purposes, FIG. 6A shows the SPP LC lens stack 600 may include eight SPP LC lenses 610, and each SPP LC lens 610 may include three concentric ring-shaped zones of increasing radii: a first zone 610-1, a second zone 610-2 and a third zone 610-3. The first zones 610-1 of the eight SPP LC lenses 610 may have the same radius, the second zones 610-2 of the eight SPP LC lenses 610 may have the same radius, and the third zones 610-3 of the eight SPP LC lenses 610 may have the same radius.

A problem of such an SPP LC lens stack 600 is that chief rays (ray from an off-axis point in an object passing through the center of an aperture stop) from different off-axis points in the object may experience different phase after transmitted through the SPP LC lens stack 600 due to the unmatched Fresnel resets. For example, shown in FIG. 6A, a chief ray 601 may propagate through eight second zones 610-2, a chief ray 603 may propagate through seven second zones 610-2 and one first zone 610-1, a chief ray 605 may propagate through six second zones 610-2 and two first zone 610-1, and so on, a chief ray 613 may propagate through eight first zones 610-1. That is, chief rays 601, 603, 605, 607, 609, 611 and 613 each may experience a different phase after transmitted through the SPP LC lens stack 600 due to the unmatched Fresnel resets. As a result, when cutting up the pupil with unmatched Fresnel resets, each slide may have a different phase.

Figure 6B:
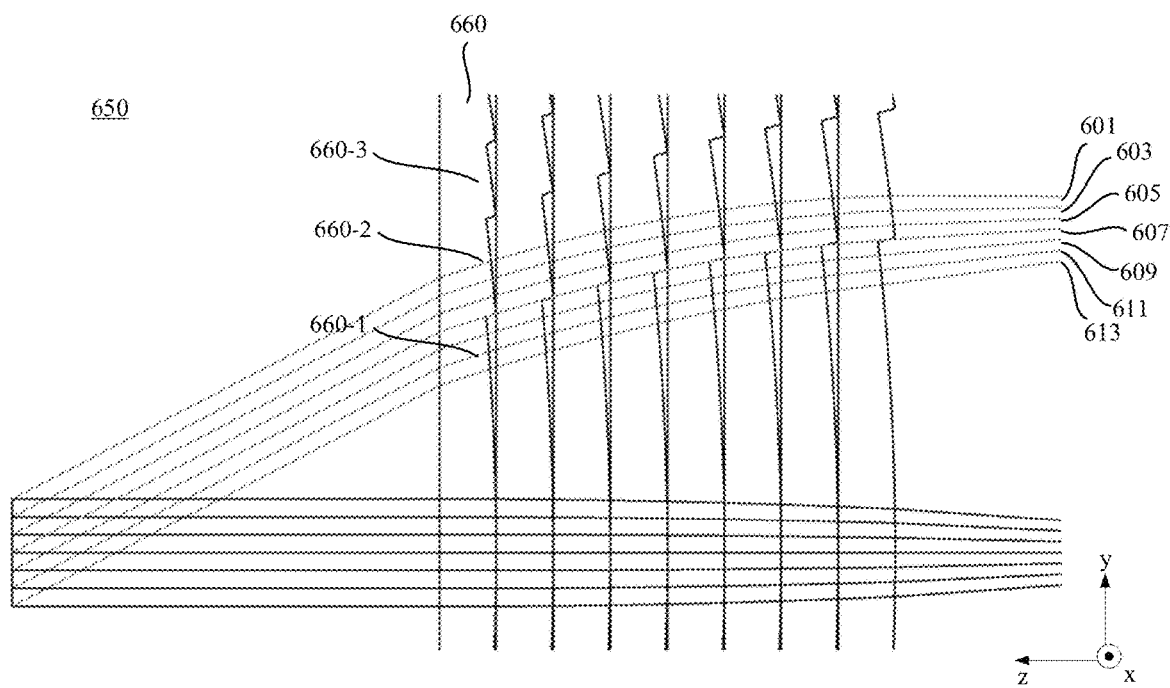
FIG. 6B illustrates a schematic diagram of an SPP LC lens stack having Fresnel resets offset according to an embodiment of the disclosure.

In view of this, in the disclosed embodiments, the SPP LC lens stack may be configured to have Fresnel resets offset. FIG. 6B illustrates a schematic diagram of an SPP LC lens stack 650 having Fresnel resets offset according to an embodiment of the disclosure. For illustrative purposes, FIG. 6B shows the SPP LC lens stack 650 may include eight SPP LC lenses 660, and each SPP LC lens 660 may include three concentric ring-shaped zones or Fresnel resets of increasing radii: a first zone 660-1, a second zone 660-2 and a third zone 660-3. The Fresnel resets may be offset by following chief ray from nominal eye relief, such that the number of cuts may be reduced. For example, as shown in FIG. 6B, the first zones 660-1 of the eight SPP LC lenses 660 may be offset by following the chief ray 607 from nominal eye relief, the second zones 660-2 of the eight SPP LC lenses 660 may be offset by following the chief ray 601 from nominal eye relief. Thus, the chief rays 601, 603 and 605 may experience the same phase, and the chief rays 607, 609, 611 and 613 may experience the same phase. Thus, the number of cuts in the pupil may be reduced. For example, the pupil could still be cut up by 1 mm slices at edge of field.

Figure 7:
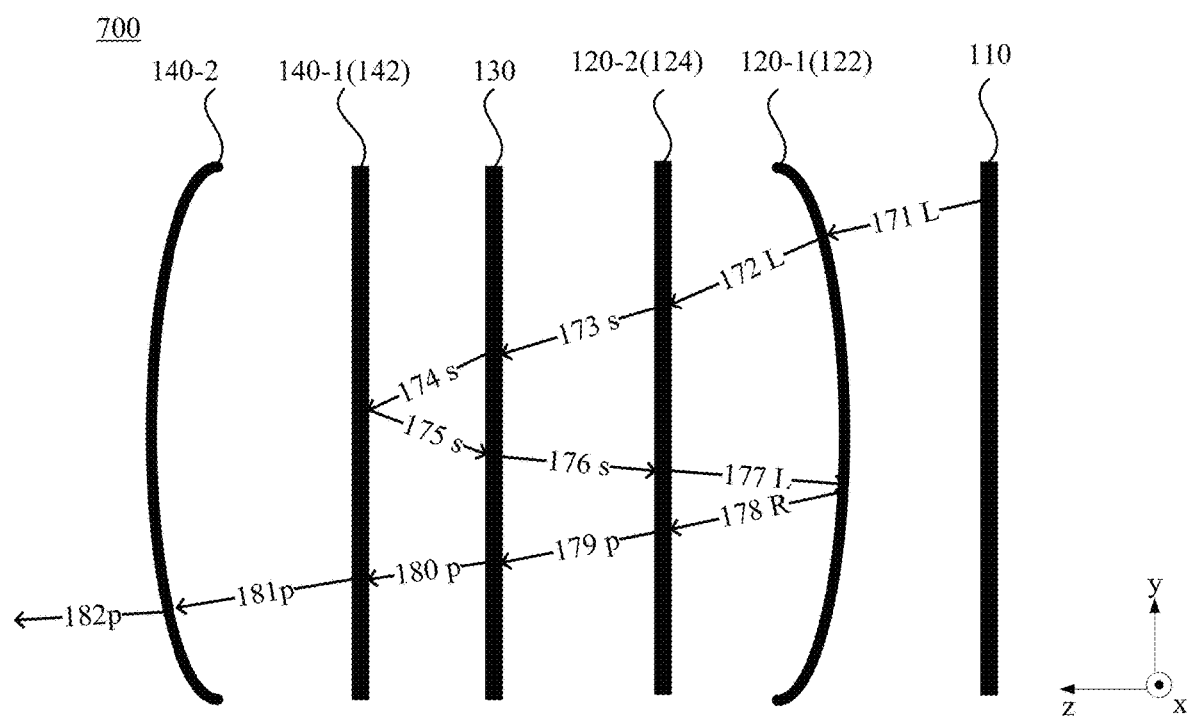
FIG. 7 illustrates a schematic diagram of a light propagation in a pancake lens assembly according to an embodiment of the disclosure.

FIG. 7 illustrates a schematic diagram of a light propagation 700 in a pancake lens assembly 100 according to an embodiment of the disclosure. The varifocal lens 130 may be any one of the disclosed SPP LC lens or SPP LC lens stack. In FIG. 7, s denotes s-polarized light, p denotes p-polarized light, R denotes right-handed circularly polarized light, and L denotes left-handed circularly polarized light. In one embodiment, as shown in FIG. 7, light 171 emitted from the electronic display 110 may be left-handed circularly polarized light (L) and transmitted to the mirrored surface 122. After the left-handed circularly polarized light (L) 171 reaches the mirrored surface 122, a first portion of the light 171 may be reflected by the mirrored surface 122, and a second portion of the light 171 may be transmitted by the mirrored surface 122, becoming left-handed circularly polarized light (L) 172 propagating towards the waveplate surface 124. The waveplate surface 124 may be a quarter-wave plate that converts the left-handed circularly polarized light (L) 172 to s-polarized light 173, which is incident onto the LC lens 130 then transmitted as s-polarized light 174.

The reflective polarizer surface 142 may reflect light that is polarized in a blocking direction (e.g., x-axis direction), and transmit light that is polarized in a perpendicular direction (e.g., y-axis direction). That is, the reflective polarizer surface 142 may transmit p-polarized light and reflect s-polarized light. Thus, the s-polarized light 174 traveling in the positive z-direction from the LC lens 130 may be reflected by the reflective polarizer surface 142 to be s-polarized light 175 traveling in the negative z-direction. The reflected s-polarized light 175 may be transmitted through the LC lens 130 for a second time to be s-polarized light 176, which is transmitted through the waveplate surface 124 for a second time and converted to left-handed circularly polarized light (L) 177 traveling in the negative z-direction. The left-handed circularly polarized light (L) 177 traveling in the negative z-direction may be reflect by the mirrored surface 122 to be right-handed circularly polarized light (R) 178, which is then transmitted through the waveplate surface 124 and converted to be p-polarized light 179. The p-polarized light 179 may be transmitted through the LC lens 130 for a third time to be p-polarized light 180, which is transmitted through the reflective polarizer surface 142 to be p-polarized light 181. The p-polarized light 181 may be transmitted through the second surface 140-2 of the second optical element to be incident into the user eye.

Through configuring the light from the electronic display 110 to be transmitted through the LC lens 130 three times by polarization controlling, the optical power added to the pancake lens assembly 100 by the LC lens 130 may be at least tripled. For example, provided that the first optical element 120, the second optical element 140 and the LC lens 130 have an optical power of D1, D2 and D3, respectively, the LC lens 130 may add an optical power of at least tripled D3 to the pancake lens assembly 100. That is, the total optical power of the pancake lens assembly 100 may be equal to at least (D1+D2+3*D3).

For illustrative purposes, FIG. 7 shows the light 171 emitted from the electronic display 110 is left-handed circularly polarized light (L). In some embodiments, light emitted from the electronic display 110 may be right-handed circularly polarized light (R). In some embodiments, light emitted from the electronic display 110 may be linearly polarized light, and a quarter-wave plate may be arranged between the electronic display 110 and the mirrored surface 122, or bonded to or formed on the mirrored surface 122 to convert the linearly polarized light to circularly polarized light. In some embodiments, light emitted from the electronic display 110 may be unpolarized light, and a linear polarizer and a quarter-wave plate may be arranged between the electronic display 110 and the mirrored surface 122, or bonded to or formed on the mirrored surface 122. The linear polarizer may convert the unpolarized light from the electronic display 110 to be linear polarized light, and the quarter-wave plate may be orientated relative to the linear polarizer to convert the linear polarized light received from the linear polarizer to circularly polarized light.

Figure 8:
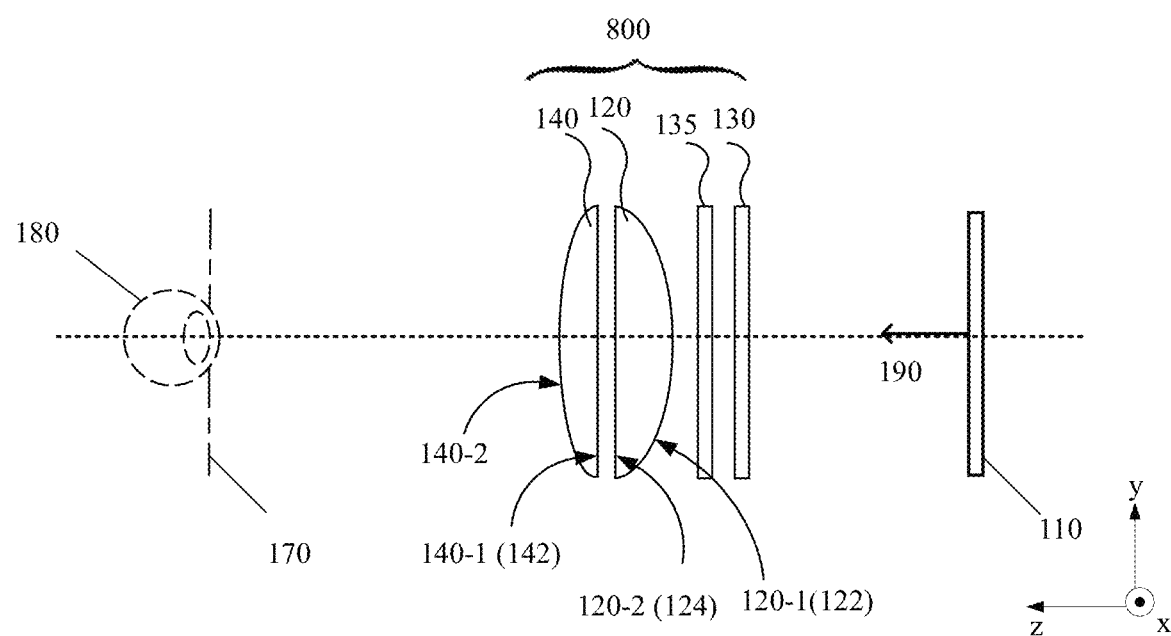
FIG. 8 illustrates a schematic diagram of a pancake lens assembly according to an embodiment of the disclosure.

In some embodiments, the varifocal lens 130, e.g., an SPP LC lens 130, may be disposed outside the cavity formed by the first optical element and the second optical element. FIG. 8 illustrates a schematic diagram of a pancake lens assembly 800 according to an embodiment of the disclosure. The similarities between FIG. 8 and FIG. 1 are not explained, while certain difference may be explained. As shown in FIG. 8, the SPP LC lens 130 may be disposed outside the cavity formed by the first optical element 120 and the second optical element 140. In some embodiments, the SPP LC lens 130 may be disposed between the first optical element 120 and the electronic display 110, i.e., disposed before the first optical element 120 in optical series.

Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

The pancake lens assembly 800 may further include a quarter-wave plate 135 disposed between the SPP LC lens 130 and the first optical element 120, and configured to receive a linearly polarized light from the SPP LC lens 130. A polarization axis of the quarter-wave plate 135 may be orientated relative to the polarization direction of the linearly polarized light received from the SPP LC lens 130 to convert the linearly polarized light to a circularly polarized light to be incident onto the first optical element 120.

In some embodiments, when the light 190 emitted from the electronic display 110 is a circularly polarized light, a quarter-wave plate may be disposed between the SPP LC lens 130 and the electronic display 110 to convert the circularly polarized light to a linearly polarized light that is incident onto the SPP LC lens 130. In some embodiments, the SPP LC lens 130 (e.g., the alignment direction of the SPP LC lens 130) may be oriented relative to the polarization direction of the linearly polarized incident light to provide an adjustable optical power to the pancake lens assembly 800, thereby realizing a varifocal pancake lens assembly. In some embodiments, when the light 190 emitted from the electronic display 110 is a linearly polarized light, the SPP LC lens 130 (e.g., the alignment direction of the SPP LC lens 130) may be oriented relative to the polarization direction of the linearly polarized light to provide an adjustable optical power to the pancake lens assembly 800. In some embodiments, when the light 190 emitted from the electronic display 110 is a unpolarized light, a linear polarizer may be disposed between the SPP LC lens 130 and the electronic display 110 to convert the unpolarized light to a linearly polarized light.

For illustrative purposes, FIG. 8 shows the SPP LC lens 130 is disposed outside the cavity formed by the first optical element 120 and the second optical element 140, and disposed at a side of the cavity facing the electronic display 110. In another embodiment, the SPP LC lens 130 may be disposed at a side of the cavity far away from the electronic display 110. For example, the SPP LC lens 130 may be disposed between the second optical element 140 and the eye 180 to receive a linearly polarized light from the second optical element 140. That is, the SPP LC lens 130 may be disposed after the second optical element 140 in optical series. In some embodiments, the SPP LC lens 130 (e.g., the alignment direction of the SPP LC lens 130) may be oriented relative to the polarization direction of the linearly polarized light to provide an adjustable optical power to the pancake lens assembly 800.

Figure 9A:
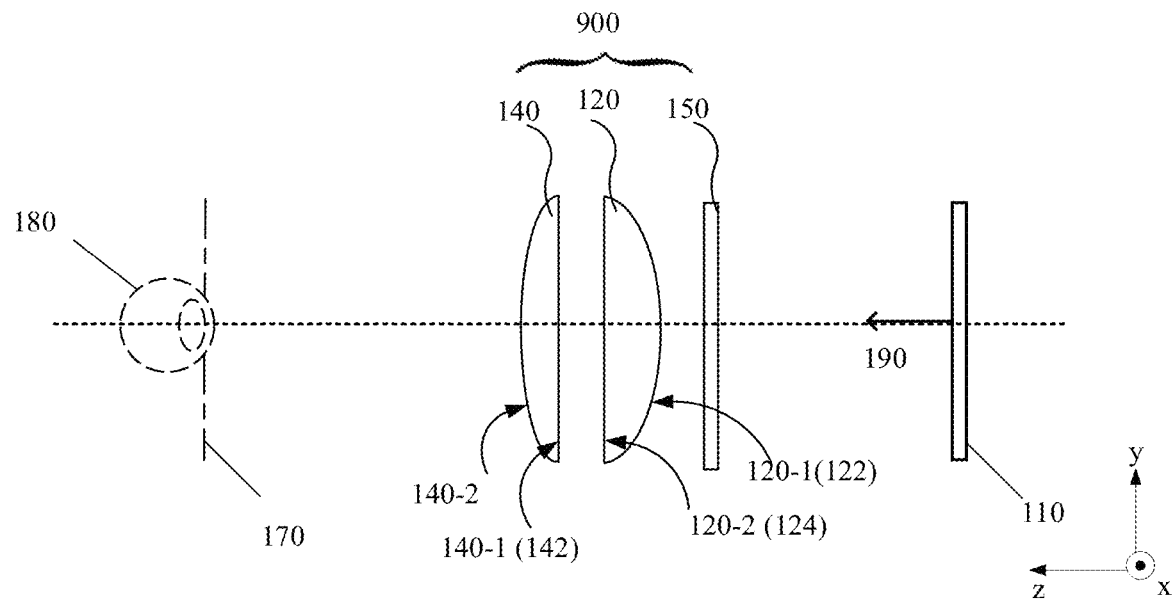
FIGS. 9A-9B illustrate schematic diagrams of pancake lens assemblies according to embodiments of the disclosure.

In some embodiments, the varifocal lens 130 may include a Pancharatnam Berry Phase (PBP) LC lens stack. FIG. 9A illustrates a schematic diagram of a pancake lens assembly 900 according to an embodiment of the disclosure. The similarities between FIG. 9A and FIG. 1 are not explained, while certain difference may be explained. As shown in FIG. 9A, the varifocal lens 130 may include a Pancharatnam Berry Phase (PBP) LC lens stack 150, which is arranged outside the cavity formed by the first optical element 120 and the second optical element 140. The PBP LC lens stack 150 may be disposed at a side of the cavity facing the electronic display 110, for example, between the first optical element 120 and the electronic display 110. That is, the PBP LC lens stack 150 may be disposed before the first optical element 120 in optical series. The PBP LC lens stack 150 may provide a plurality of discrete focal states (or optical states).

Figure 10:
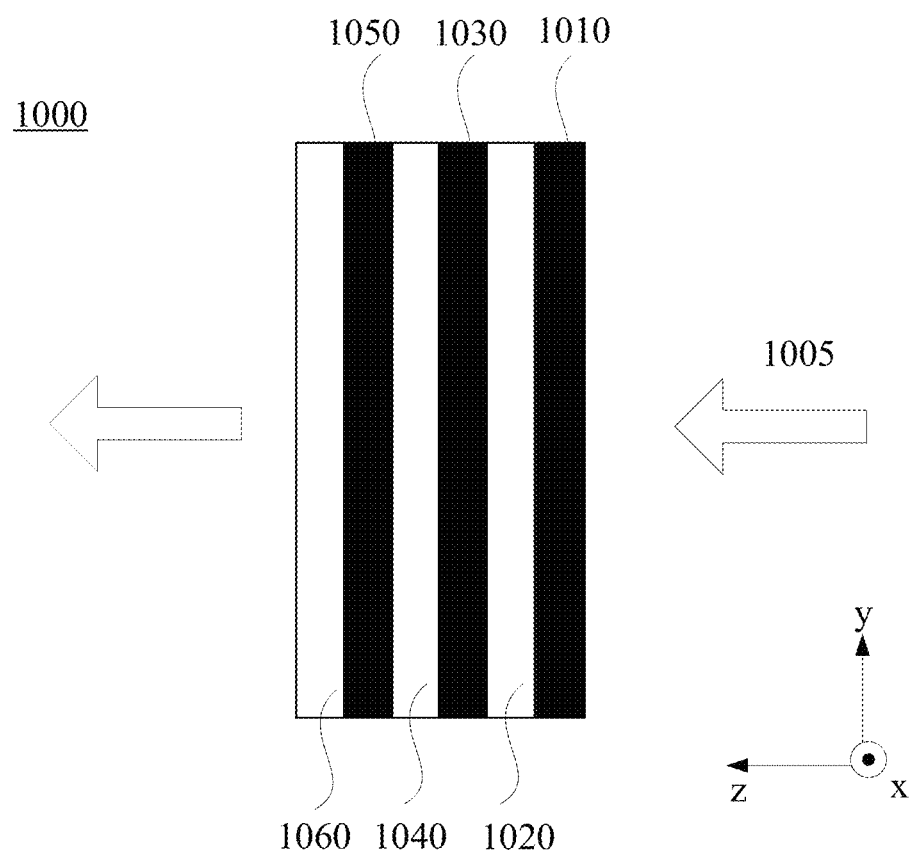
FIG. 10 illustrates a schematic diagram of a Pancharatnam Berry Phase (PBP) LC lens stack according to an embodiment of the disclosure.

FIG. 10 illustrates a schematic diagram of a Pancharatnam Berry Phase (PBP) LC lens stack 1000 according to an embodiment of the disclosure. As shown in FIG. 10, the PBP LC lens stack 1000 may include a plurality of PBP LC lenses and a plurality of switchable half-wave plates (SHWPs). The PBP LC lenses and SHWPs may be alternately arranged. For illustrative purposes, FIG. 10 shows the PBP LC lens stack 1000 may include SHWPs 1010, 1030, 1050 and PBP LC lenses 1020, 1040, 1060 alternately arranged. The SHWP 1010, 1030, 1050 may be a half-waveplate that transmits a polarized light of a specific handedness in accordance with a switching state of the SHWP. The PBP LC lens 1020, 1040, 1060 may provide an optical power according to the handedness of circularly polarized light incident on the PBP LC lens 1020, 1040, 1060.

Figure 11:
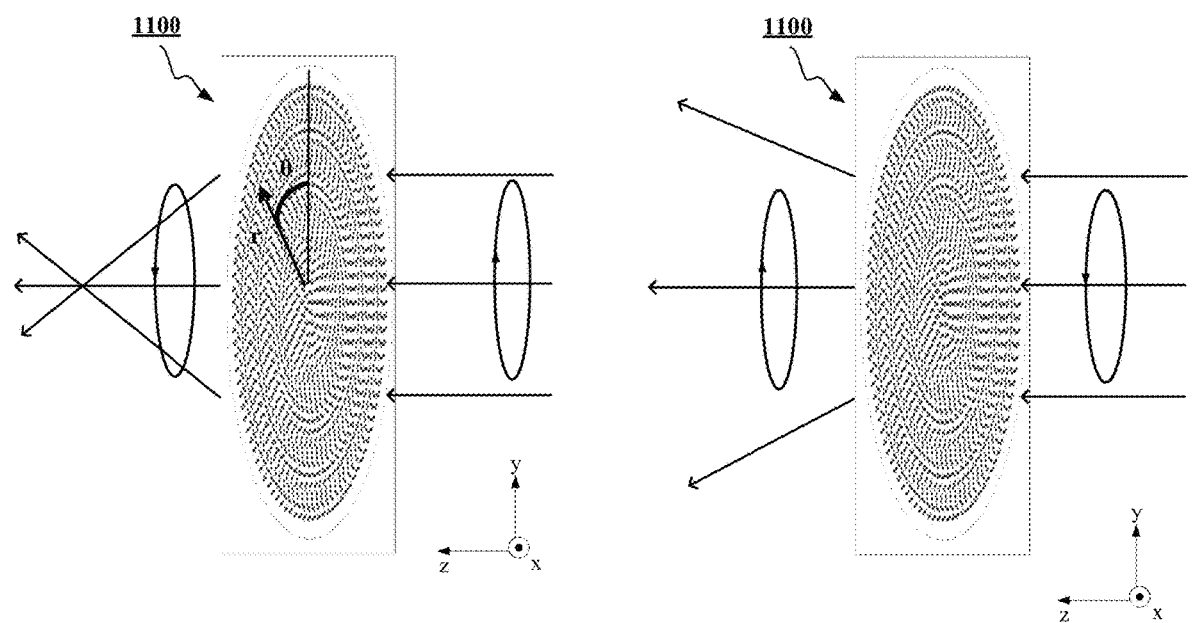
FIG. 11 illustrates a schematic diagram of a PBP LC lens according to an embodiment of the disclosure.
Figure 12A:
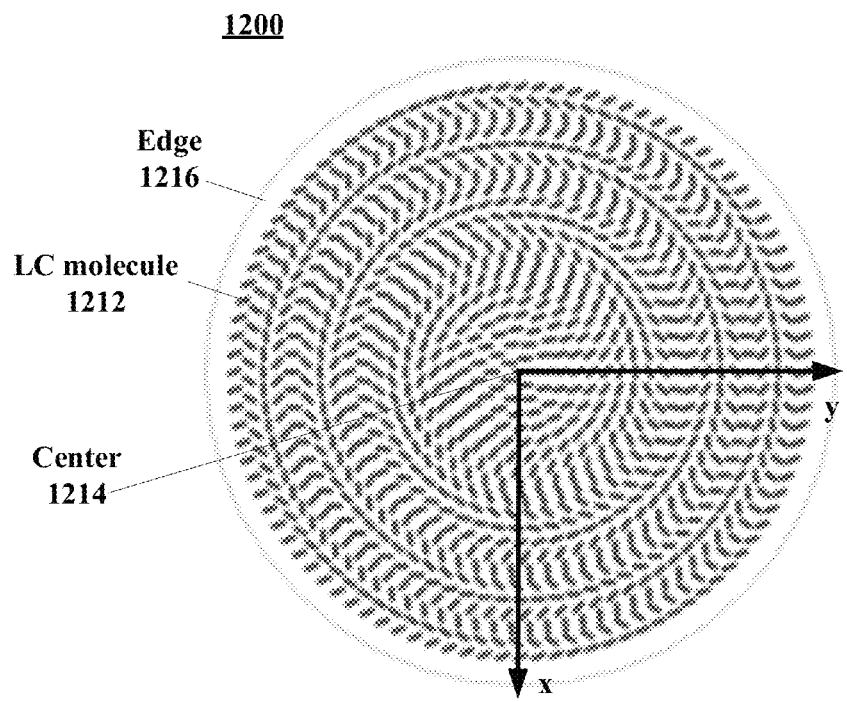
FIG. 12A illustrates LC orientations in the PBP LC lens in FIG. 11.
Figure 12B:
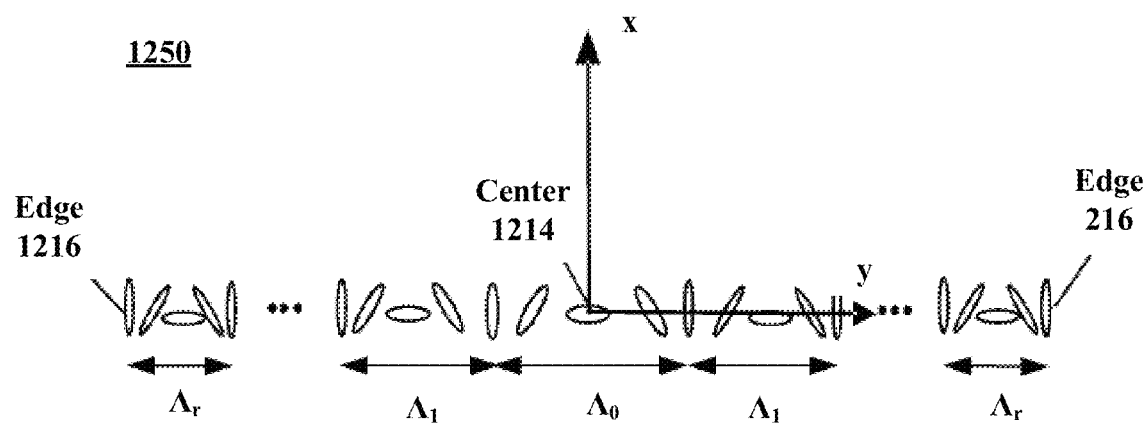
FIG. 12B illustrates a section of LC orientations taken along y-axis in the PBP LC lens in FIG. 11.

FIG. 11 illustrates a schematic diagram of a PBP LC lens 1100 according to an embodiment of the disclosure. As shown in FIG. 11, the PBP LC lens 1100 may create a lens profile via an in-plane orientation (θ, azimuth angle) of liquid crystal (LC) molecules. The phase difference of the PBP LC lens 1100 may be calculated as T=2θ. FIG. 12A illustrates LC orientations 1200 in the PBP LC lens 1100 shown in FIG. 11. As shown in FIG. 12A, in the PBP LC lens 1100, an azimuth angle (θ) of an LC molecule 1212 may be continuously changed from a center 12114 to an edge 1216 of the PBP LC lens 1100, with a varied pitch A. Pitch is defined in a way that the azimuth angle of LC is rotated 180° from the initial state. FIG. 12B illustrates a section of LC orientations 1250 taken along y-axis in the PBP LC lens 1100 shown in FIG. 11. As shown in FIG. 12B, a rate of pitch variation may be a function of distance from the lens center 1214. The rate of pitch variation may increase with distance from the lens center. For example, the pitch at the lens center 1214 ($\Lambda_0$) may be the slowest, and the pitch at the edge 1216 ($\Lambda_r$) may be the highest, i.e., $\Lambda_0 > \Lambda_1 > \ldots > \Lambda_r$.

Returning to FIG. 11, in the x-y plane, to obtain a PBP LC lens with lens radius (r) and lens power (+/−f), the azimuth angle θ may satisfy:

$$2\theta = \frac{\pi r^2}{f * \lambda}, \tag{2}$$

where λ is the wavelength of incident light. The PBP LC lens 1100 may be active (also referred to as an active element) or passive (also referred to as a passive element). An active PBP LC lens may have three discrete focal states (also referred to as optical states). The three optical states are an additive state, a neutral state, and a subtractive state. In particular, the additive state may add optical power to the system (i.e., have a positive focus of 'f'), and the subtractive state may subtract optical power from the system (i.e., have a negative focus of '−f'). When not in the neutral state, the active PBP LC lens may reverse the handedness of circularly polarized light passing through the active PBP LC lens in addition to focusing/defocusing the incident light. When in the neutral state, the active PBP LC lens may not affect the optical power of the system, but may or may not affect the polarization of light transmitted through the active PBP LC lens.

The state of an active PBP LC lens may be determined by the handedness of polarization of light incident on the active PBP LC lens and an applied voltage. In some embodiments, as shown in FIG. 11, an active PBP LC lens may operate in an additive state that adds optical power to the system in response to incident light with a right-handed circular polarization and an applied voltage of zero (or more generally below some minimal value), operate in a subtractive state that removes optical power from the system in response to incident light with a left-handed circular polarization and the applied voltage of zero (or more generally below some minimal value), and operate in a neutral state (regardless of polarization) that does not affect the optical power of the system in response to an applied voltage larger than a threshold voltage that aligns LCs along with the electric field.

In contrast, a passive PBP LC lens may have two optical states: an additive state and a subtractive state. The state of a passive PBP LC lens may be determined by the handedness of circularly polarized light incident on the passive PBP LC lens. In some embodiments, referring to FIG. 11, a passive PBP LC lens may operate in an additive state that adds optical power to the system in response to incident light with a right-handed circular polarization, and operate in a subtractive state that removes optical power from the system in response to incident light with a left-handed circular polarization. A passive PBP LC lens may output light that has a handedness opposite that of the light input into the passive PBP LC lens.

Returning to FIG. 10, the PBP LC lens stack 1000 may control the handedness of a circularly polarized light incident onto a PBP LC lens in accordance with a switching state of a SHWP. The switching state of the SHWP is either active or non-active. When active, the SHWP may reverse the handedness of polarized light, and when non-active, the SHWP may transmit the circularly polarized light without affecting the handedness. As discussed above, in some embodiments, a PBP LC lens acts in an additive state when receiving right-handed circularly polarized (RCP) light, and conversely, acts in a subtractive state if when receiving left-handed circularly polarized (LCP) light. Accordingly, a SHWP placed before a PBP LC lens in optical series may be able to control whether the PBP LC lens acts in an additive or subtractive state by controlling the handedness of the circularly polarized light incident onto the PBP LC lens.

As shown in FIG. 10, input light 1005 may be left-handed circularly polarized (LCP) light or right-handed circularly polarized (RCP) light. The state of the SHWP 1010, 1030, 1050 may determine the handedness of the light output from the SHWP 1010, 1030, 1050. When not in a neutral state, an active PBP LC lens may reverse the handedness of circularly polarized light in addition to focusing/defocusing the incident light. Hence, when the input light 1005 is left-handed circularly polarized (LCP) light and the SHWP 1010 is active, the PBP LC lens 1020 may receive right-handed circularly polarized (RCP) light and output left-handed circularly polarized (LCP) light with an increment of optical power of R. When the input light 1005 is right-handed circularly polarized (RCP) light and the SHWP 1010 is active, the PBP LC lens 1020 may receive left-handed circularly polarized (LCP) light and output right-handed circularly polarized (RCP) light with a reduction of optical power of −R. When non-active, the SHWP 1010 may transmit the input light 1005 without affecting the handedness. The operation principle of the SHWP 1030, 1050 and PBP LC lens 1040, 1060 may refer to that of the SHWP 1010 and the PBP LC lens 1020, and the details are not repeated here. The design of the PBP LC lens stack shown in FIG. 10 is merely for illustrative purposes, and other designs of the PBP LC lens stack may be used according to various application scenarios.

Referring to FIG. 10 and FIG. 9A, design specifications for HMDs used for VR, AR, or MR applications typically requires a large range of optical power to adapt for human eye vergence-accommodation (e.g., ~±2 Diopters or more), fast switching speed (about 300 ms), and a good quality image. A PBP LC lens is able to meet these design specifications using LC materials having a relatively high index of refraction. The PBP LC lens stack 150 may provide any number of focus planes from two focus planes to more than two focus planes. Further, through increasing the number of PBP LC lenses and SHWPs in the PBP LC lens stack 150, the number of focal planes may be increased, and the focal length interval (i.e., the resolution step of the PBP LC lens stack) may be reduced, thereby providing a continuous varifocal optical power merely by the PBP LC lens stack 150. In other words, a varifocal pancake lens assembly may be realized. Further, the response time of the PBP LC lens stack 150 may be limited by the response of the SHWP which can be less than 1 ms by using ferroelectric SHWP. The maximum response time of the SHWP may be less than 15 ms when using a twisted nematic (TN) SHWP.

Figure 9B:
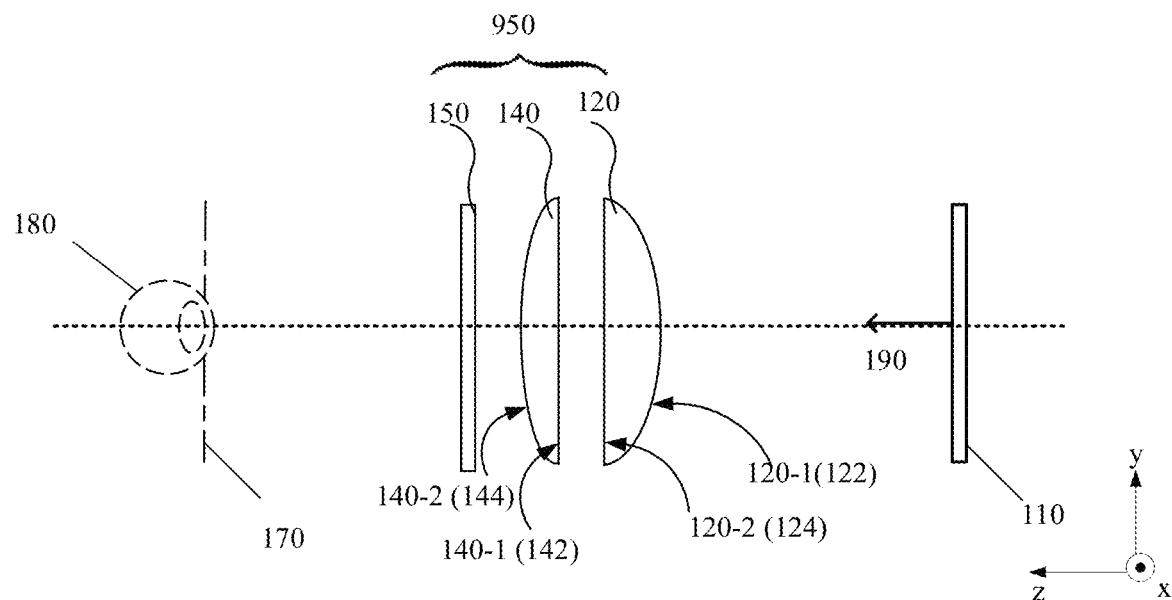

In some embodiments, the PBP LC lens stack 150 may be disposed at a side of the cavity facing away from the electronic display 110. FIG. 9B illustrates a schematic diagram of a pancake lens assembly 950 according to an embodiment of the disclosure. The similarities between FIG. 9B and FIG. 1 are not explained, while certain difference may be explained. As shown in FIG. 9B, the PBP LC lens stack 150 may be disposed between the second optical element 140 and the eye 180. That is, the PBP LC lens stack 150 may be disposed after the second optical element 140 in optical series.

The second optical element 140 may further include a waveplate surface 144 in addition to the reflective polarizer surface 142, which is a separate layer or coating bonded to or formed on the second optical element 140. In some embodiments, the waveplate surface 144 may be bonded to or formed on the second surface 140-2 of the second optical element 140, and the reflective polarizer surface 142 may be bonded to or formed on the first surface 140-1 of the second optical element 140. In some embodiments, the waveplate surface 144 may include a quarter-wave plate (QWP) similar to the waveplate surface 124 of the first optical element 120. The waveplate surface 144 may convert a linearly polarized light received from the reflective polarizer surface 142 to a circularly polarized light, which is incident onto the PBP LC lens stack 150.

In some embodiments, the pancake lens assembly may include both an LC lens (e.g., an SPP LC lens) and a PBP LC lens stack. The PBP LC lens stack may provide a plurality of discrete focal states in a first step resolution, and the SPP LC lens may provide visually continuously variable focal states (i.e., a continuous range of adjustment of optical power) in a second step resolution. The first step resolution may be configured to be smaller than the second step resolution, such that when the PBP LC lens stack is switched between two discrete optical states, the LC lens may provide a continuous adjustment of optical power between the two discrete optical states. The PBP LC lens stack and the varifocal lens together may provide a continuous adjustment of optical power for the system (e.g., HMDs).

Figure 13:
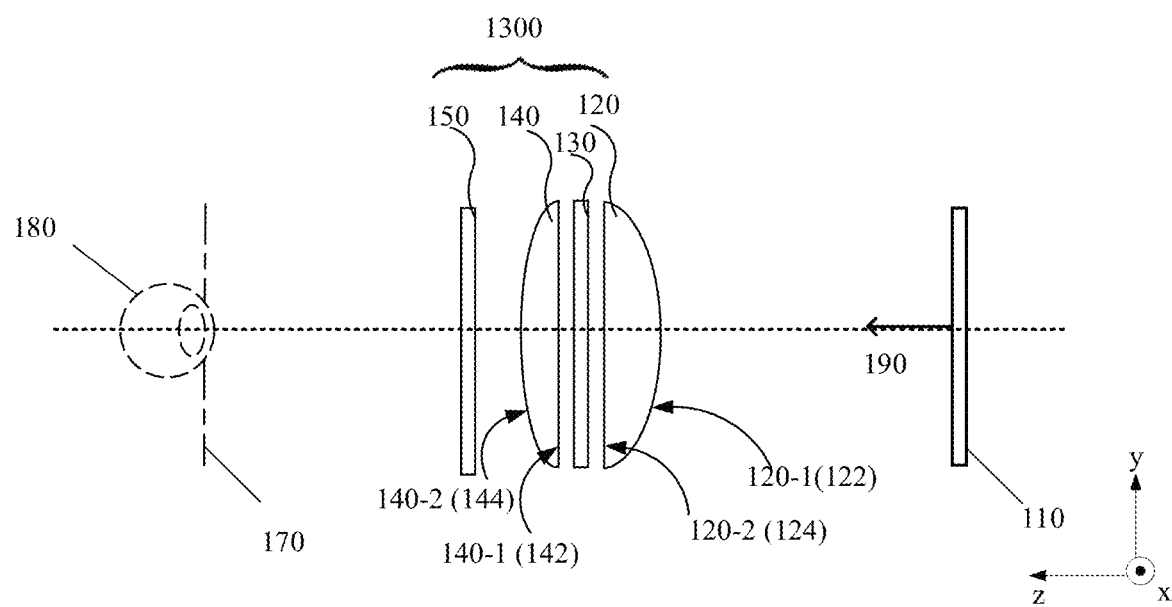
FIG. 13 illustrates a schematic diagram of a pancake lens assembly according to an embodiment of the disclosure.

FIG. 13 illustrates a schematic diagram of a pancake lens assembly 1300 having hybrid lenses according to an embodiment of the disclosure. The similarities between FIG. 13 and FIG. 1 are not explained, while certain difference may be explained. As shown in FIG. 13, the second optical element 140 may further include a waveplate surface 144 in addition to the reflective polarizer surface 142, which is a separate layer or coating bonded to or formed on the second optical element 140. In some embodiments, the waveplate surface 144 may be bonded to or formed on the second surface 140-2 of the second optical element 140, and the reflective polarizer surface 142 may be bonded to or formed on the first surface 140-1 of the second optical element 140. In some embodiments, the waveplate surface 144 may include a quarter-wave plate (QWP) similar to the waveplate surface 124 of the first optical element 120. The SPP LC lens 130 may be arranged between the first optical element 120 and the second optical element 140, and the PBP LC lens stack 150 may be arranged between the second optical element 140 and the eye 180.

In some embodiments, the PBP LC lens stack 150 may be arranged between the first optical element 120 and the electronic display 110. The PBP LC lens stack 150 may be configured to provide a plurality of discrete focal states in a relatively large step resolution. The SPP LC lens 130 may be configured to have a continuous adjustment range of optical power equal to or larger than the step resolution of the PBP LC lens stack 150. Herein the continuous adjustment range of optical power of the SPP LC lens 130 refers to a range from the minimum optical power to the maximum optical power of the SPP LC lens 130. Further, the SPP LC lens 130 may be configured to provide the continuous adjustment range of optical power in a relatively small step resolution when switching among the discrete focal states of the PBP LC lens stack 150. Because the step resolution of the SPP LC lens 130 is often too small to be perceived by human eyes, for example, the step resolution of the SPP LC lens 130 may be smaller than 1/10 of the second step resolution of PBP LC lens stack 150, the PBP LC lens stack 150 and the SPP LC lens 130 together may provide continuously variable focal states (i.e., a continuous adjustment range of optical power) for the system. Thus, when switching among the discrete focusing states of the PBP LC lens stack 150, the image distortion caused by large step resolution of the PBP LC lens stack 150 may be suppressed, and smoother transition between different focal states may be perceived by the human eyes. The continuous adjustment range of optical power of the PBP lens assembly 800 may be determined by the optical power of the PBP LC lens stack 150, for example, a range from the maximum optical power to the minimum optical power of the PBP LC lens stack 150.

Figure 14:
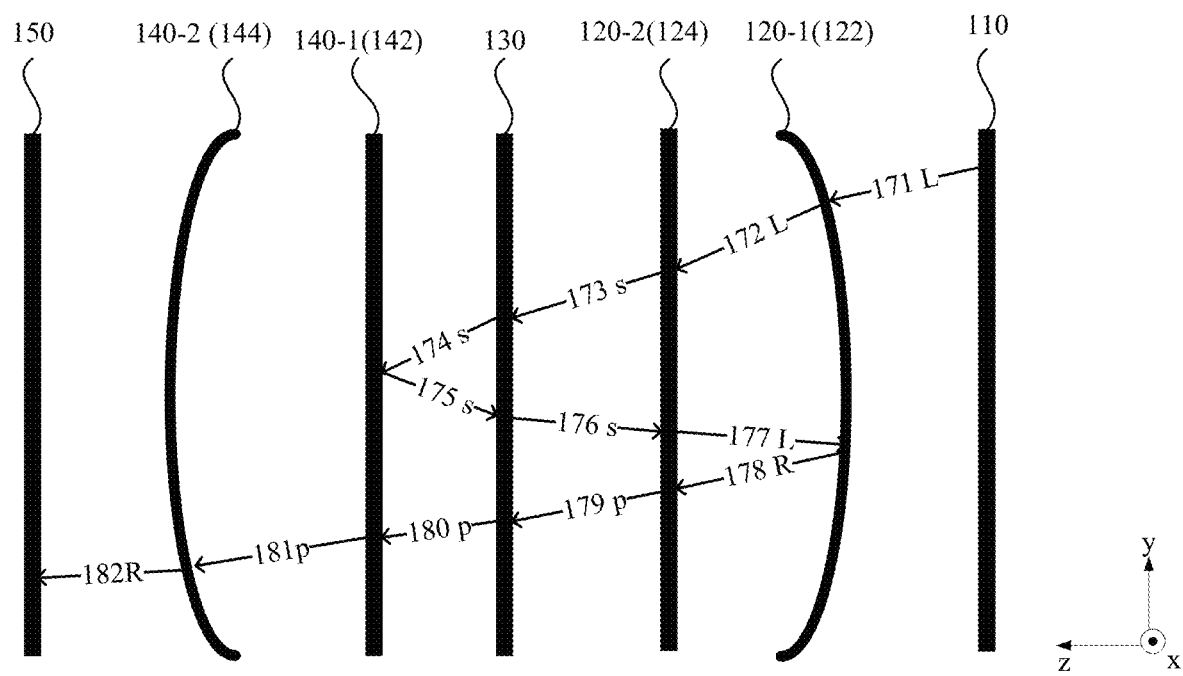
FIG. 14 illustrates a schematic diagram of a light propagation in a pancake lens assembly according to an embodiment of the disclosure.

FIG. 14 illustrates a schematic diagram of a light propagation 1400 in the pancake lens assembly 1300 in FIG. 13. The similarities between FIG. 14 and FIG. 7 are not explained, while certain difference may be explained. As shown in FIG. 14, when the waveplate surface 144 is a quarter-wave plate, the p-polarized 181 may be converted to right-handed circularly polarized light (R) 182 after transmitted through the waveplate surface 144. The right-handed circularly polarized light (R) 182 may be incident on the PBP LC lens stack 150. Through controlling the switching state of the SWHPs in the PBP LC lens stack 150, the pancake lens assembly 800 may provide a continuous adjustment of optical power to the system.

Figure 15A:
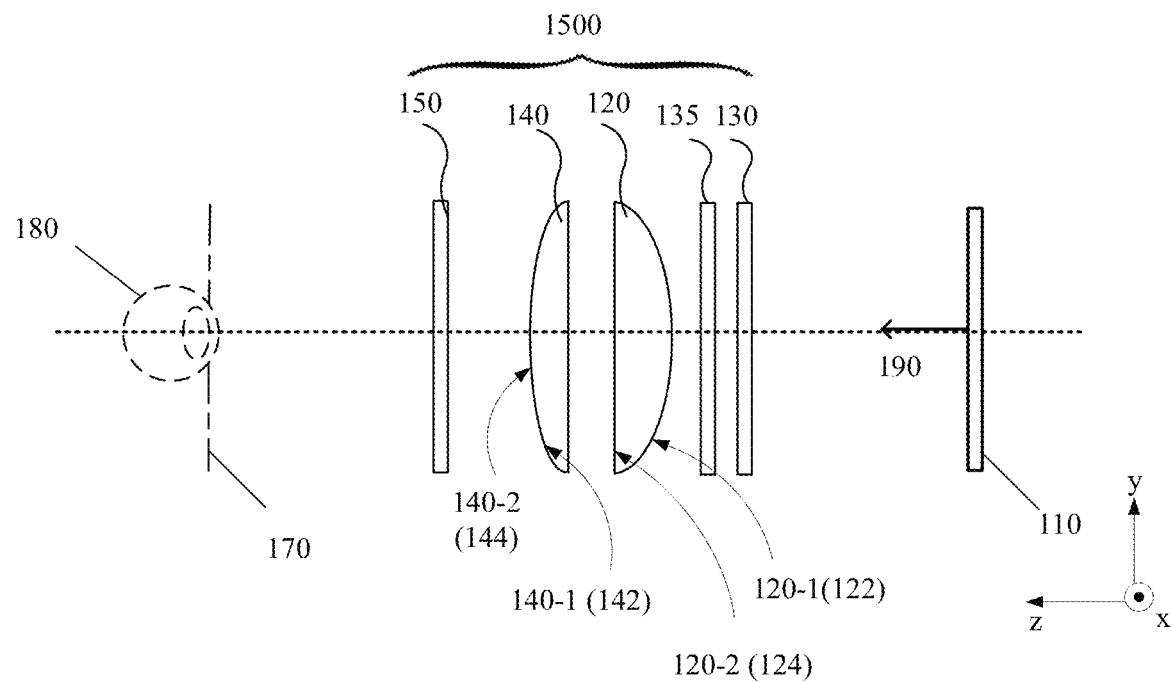
FIGS. 15A-15B illustrate schematic diagrams of pancake lens assemblies according to embodiments of the disclosure.

In some embodiments, the PBP LC lens stack and the SPP LC lens may be disposed outside the cavity and disposed at different sides of the cavity. FIG. 15A illustrates a schematic diagram of a pancake lens assembly 1500 according to an embodiment of the disclosure. The similarities between FIG. 15A and FIG. 8 are not explained, while certain difference may be explained. As shown in FIG. 15A, in the pancake lens assembly 1500, the SPP LC lens 130 may be disposed between the first optical element 120 and the electronic display 110, the quarter-wave plate 135 may be disposed between the first optical element 120 and the SPP LC lens 130. The second optical element 140 may further include the reflective polarizer surface 144, and the PBP LC lens stack 150 may be disposed between the second optical element 140 and the eye 180. The details can be referred to the descriptions of FIG. 8 and FIG. 9b, and are not repeated here.

Figure 15B:
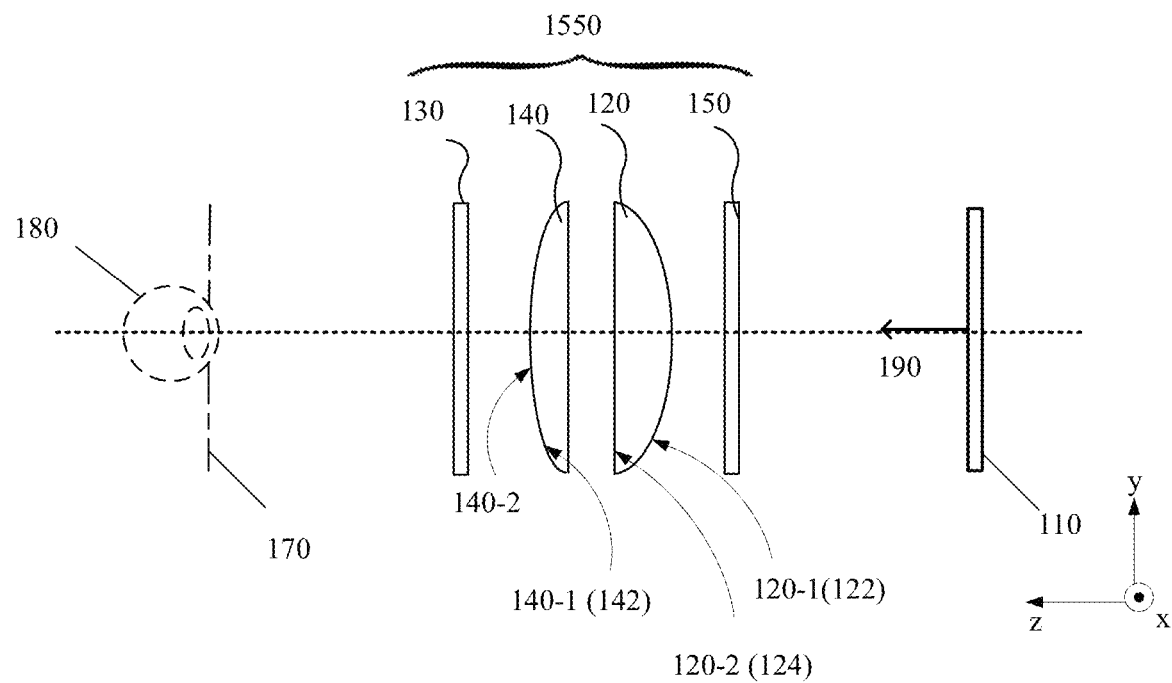

FIG. 15B illustrates a schematic diagram of a pancake lens assembly 1550 according to an embodiment of the disclosure. The similarities between FIG. 15B and FIG. 9A are not explained, while certain difference may be explained. As shown in FIG. 15B, in the pancake lens assembly 1550, the PBP LC lens stack 150 may be disposed between the first optical element 120 and the electronic display 110, and the SPP LC lens 130 may be disposed between the second optical element 140 and the eye 180.

Figure 16A:
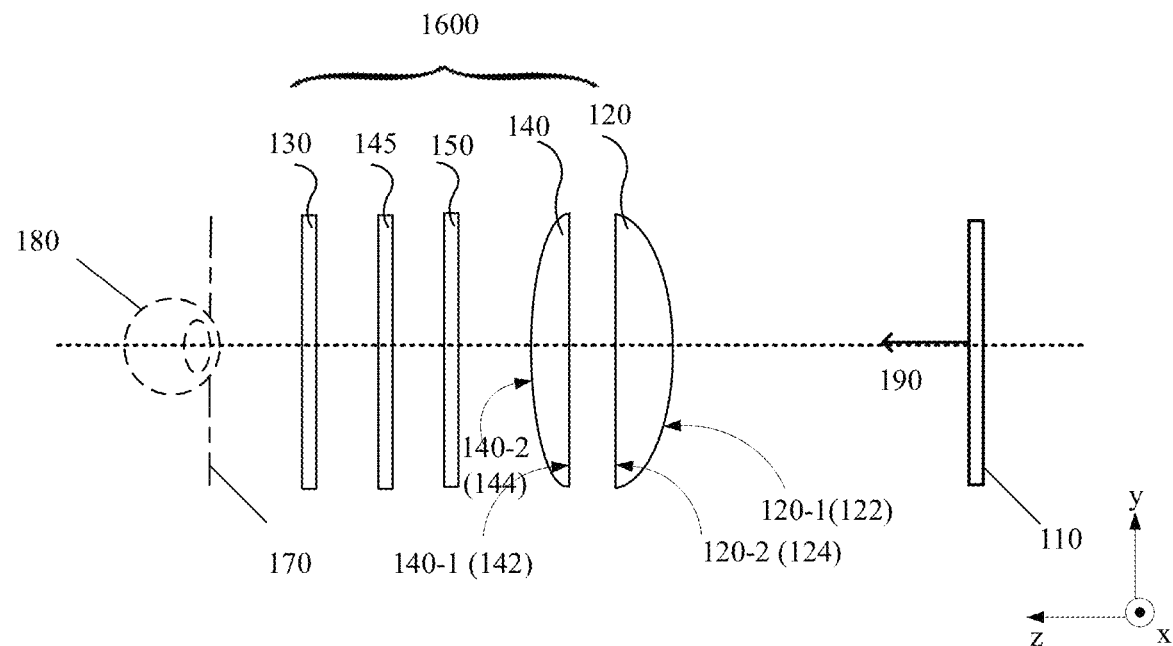
FIGS. 16A-16B illustrate schematic diagrams of pancake lens assemblies according to embodiments of the disclosure.

In some embodiments, the SPP LC lens 130 and the PBP LC lens stack 150 may be disposed outside the cavity and disposed at the same side of the cavity. FIG. 16A illustrates a schematic diagram of a pancake lens assembly 1600 according to an embodiment of the disclosure. The similarities between FIG. 16A and FIG. 9B are not explained, while certain difference may be explained. As shown in FIG. 16A, in the pancake lens assembly 1600, both the SPP LC lens 130 and the PBP LC lens stack 150 may be disposed between the second optical element 140 and the eye 180. The SPP LC lens 130 may be disposed between the PBP LC lens stack 150 and the eye 180. Further, a quarter-wave plate 145 may be disposed between the PBP LC lens stack 150 and the SPP LC lens 130 to convert a circularly polarized light received from the PBP LC lens stack 150 to a linearly polarized light, which is incident to the SPP LC lens 130. In some embodiments, the SPP LC lens 130 (e.g., the alignment direction of the SPP LC lens 130) may be oriented relative to the polarization direction of the linearly polarized incident light to provide an adjustable optical power.

Figure 16B:
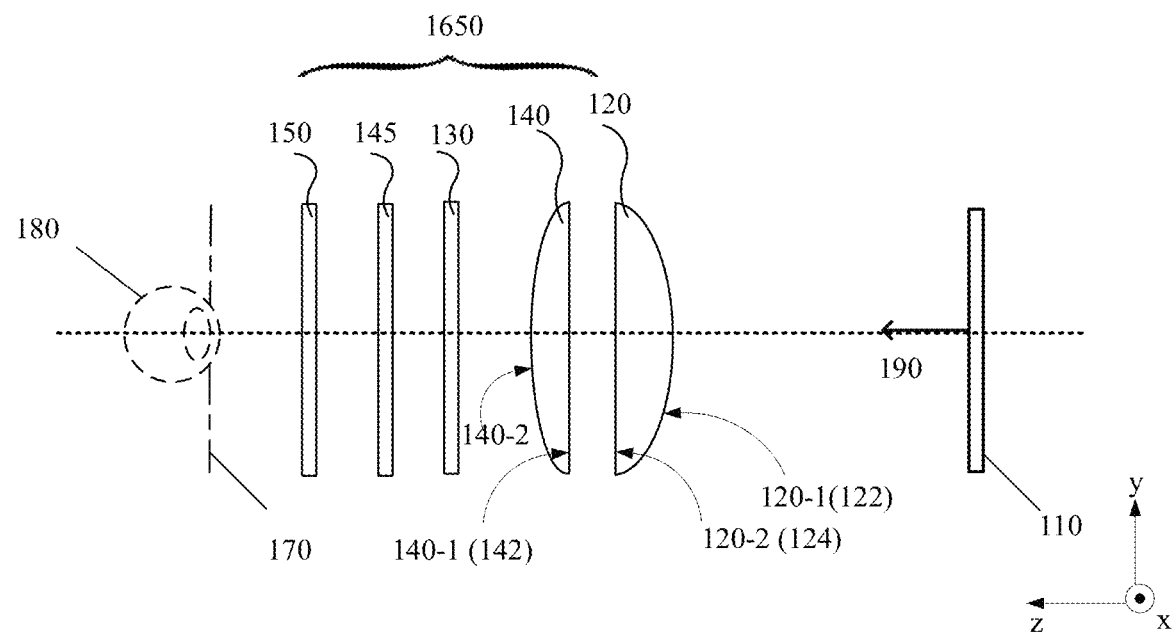

FIG. 16B illustrates a schematic diagram of a pancake lens assembly 1650 according to an embodiment of the disclosure. The similarities between FIG. 16B and FIG. 16A are not explained, while certain difference may be explained. As shown in FIG. 16B, in the pancake lens assembly 1650, the SPP LC lens 130 and the PBP LC lens stack 150 may be both disposed between the second optical element 140 and the eye 180, and the PBP LC lens stack 150 may be disposed between the SPP LC lens 130 and the eye 180. The quarter-wave plate 145 may be disposed between the PBP LC lens stack 150 and the SPP LC lens 130, and the polarization axis of the quarter-wave plate 145 may be oriented relative to the polarization direction of a linearly polarized light received from the SPP LC lens 130 to convert the linearly polarized light to a circularly polarized light, which is incident onto the PBP LC lens stack 150.

Figure 17A:
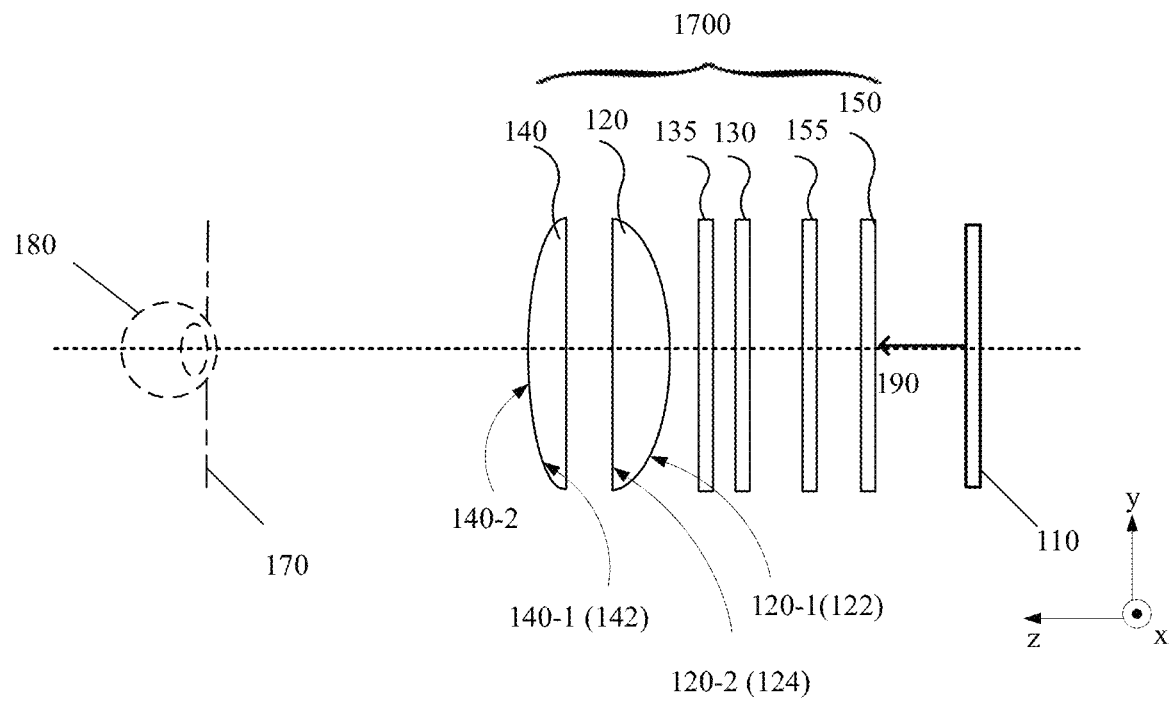
FIGS. 17A-17B illustrate schematic diagrams of pancake lens assemblies according to embodiments of the disclosure.

FIG. 17A illustrates a schematic diagram of a pancake lens assembly 1700 according to an embodiment of the disclosure. The similarities between FIG. 17A and FIG. 8 are not explained, while certain difference may be explained. As shown in FIG. 17A, in the pancake lens assembly 1700, both the SPP LC lens 130 and the PBP LC lens stack 150 may be disposed between the first optical element 120 and the electronic display 110, and the PBP LC lens stack 150 may be disposed between the first optical element 120 and the SPP LC lens 130. Further, a quarter-wave plate 155 may be disposed between the SPP LC lens 130 and the PBP LC lens stack 150. The quarter-wave plate 155 may convert a circularly polarized light received from the PBP LC lens stack 150 to a linearly polarized light, which is incident onto the SPP LC lens 130.

Figure 17B:
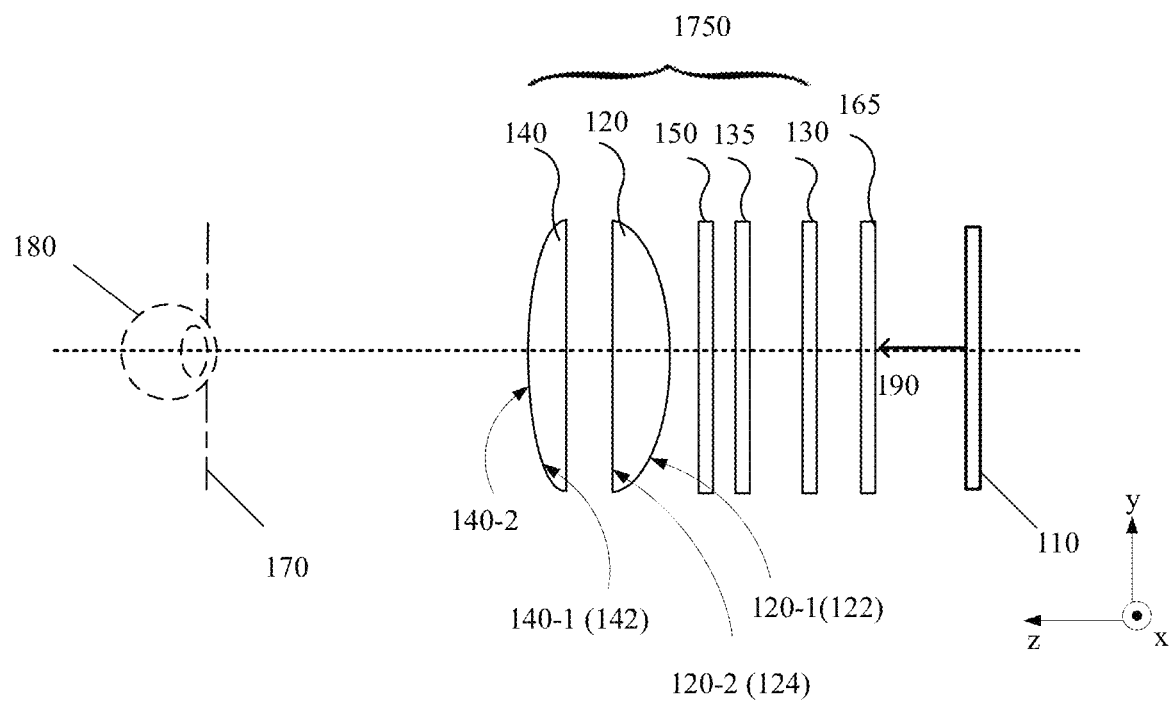

FIG. 17B illustrates a schematic diagram of a pancake lens assembly 1750 according to an embodiment of the disclosure. The similarities between FIG. 17B and FIG. 8 are not explained, while certain difference may be explained. As shown in FIG. 17B, in the pancake lens assembly 1750, the PBP LC lens stack 150 may be disposed between the first optical element 120 and the SPP LC lens 130, and the quarter-wave plate 135 may be disposed between the SPP LC lens 130 and the PBP LC lens stack 150. Provide that the light 190 emitted from the electronic display 110 is a circularly polarized light, a quarter-wave plate 165 may be disposed between the SPP LC lens 130 and the electronic display 110 to convert the circularly polarized light to a linearly polarized light, which is incident onto the SPP LC lens 130. The quarter-wave plate 135 that is disposed between the SPP LC lens 130 and the PBP LC lens stack 150 may convert a linearly polarized light received from the SPP LC lens 130 to a circularly polarized light, which is incident onto the PBP LC lens stack 150.

Figure 18:
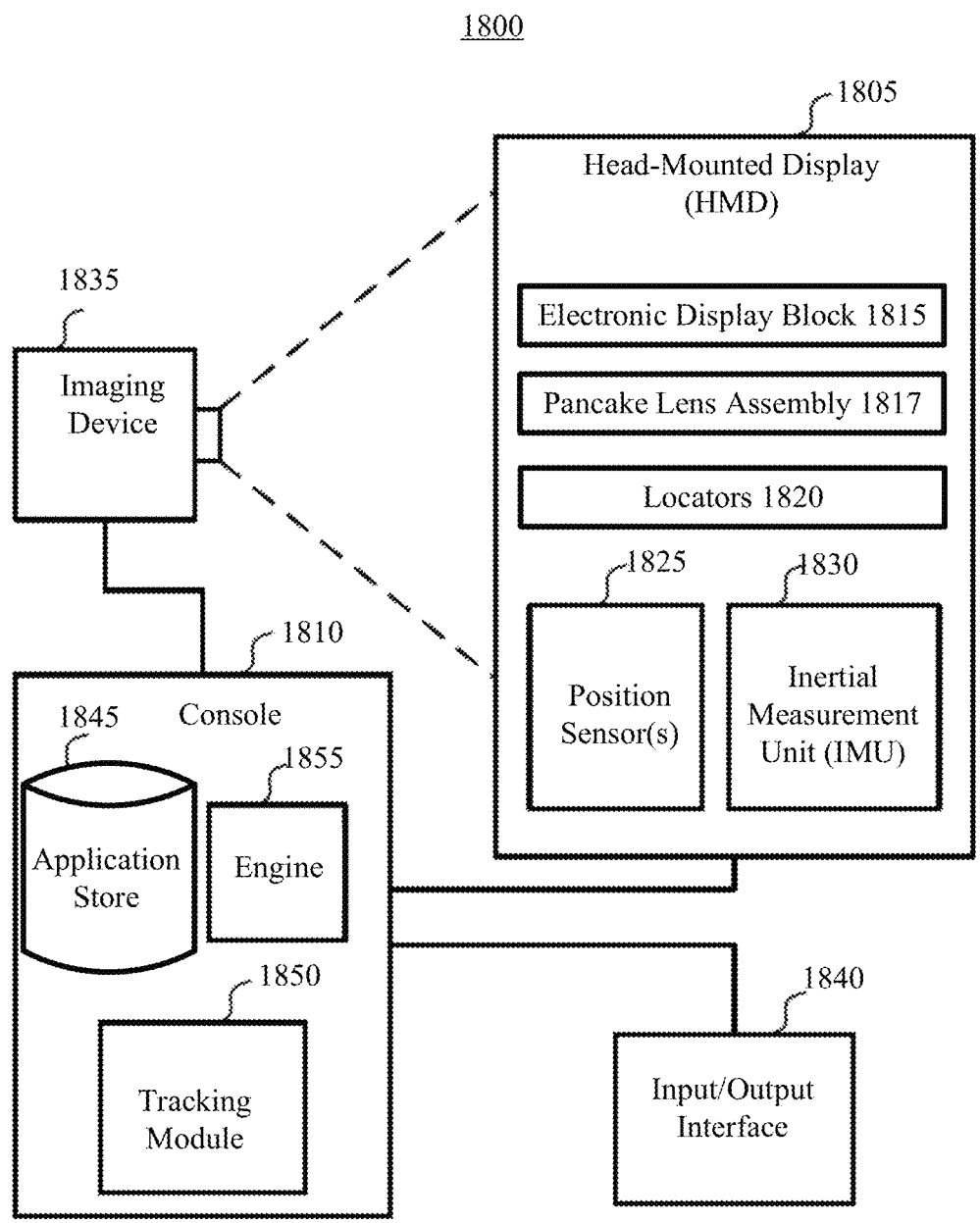
FIG. 18 illustrates a block diagram of a system environment according to an embodiment of the disclosure.

FIG. 18 illustrates a block diagram of a system environment 1800 according to an embodiment of the disclosure. As shown in FIG. 18, the system environment 1800 may include an HMD 1805, a console 1810, an imaging device 1835, and an input/output interface 1840. The HMD 1805, the imaging device 1835, and the input/output interface 1840 may be coupled to the console 1810. Although FIG. 18 shows an example system 1800 including one HMD 1805, one imaging device 1835, and one input interface 1840, in some other embodiments, any number of these components may be included in the system environment 1800. For example, the system environment 1800 may include multiple HMDs 1805 each having an associated input interface 1840 and being monitored by one or more imaging devices 1835, and each HMD 1805, input interface 1840, and imaging device 1835 may communicate with the console 1810. In some embodiments, different and/or additional components may be included in the system environment 1800. The system environment 1800 may operate in a VR system environment, an AR system environment, a MR system environment, or some combination thereof.

The HMD 1805 may be a head-mounted display that presents media to a user. Examples of media presented by the HMD include one or more images, video, audio, or some combination thereof. In some embodiments, audio may be presented via an external device (e.g., speakers and/or headphones) which receives audio information from the HMD 1805, the console 1810 or both, and presents audio data based on the audio information. An example of the HMD 1805 may be further described below in connection with FIGS. 19A and 19B.

The HMD 1805 may include one or more rigid bodies, which may be rigidly or non-rigidly coupled to each other. A rigid coupling between rigid bodies may cause the coupled rigid bodies to act as a single rigid entity. In contrast, a non-rigid coupling between rigid bodies may allow the rigid bodies to move relative to each other. In some embodiments, the HMD 1805 may present VR, AR, MR, or some combination thereof to the user. In the VR, AR and/or MR embodiments, the HMD 1805 may augment views of a physical, real-world environment with computer-generated elements (e.g., images, video, sound, etc.).

As shown in FIG. 18, the HMD 1805 may include an electronic display block 1815, a pancake lens assembly 1817, one or more locators 1820, one or more position sensors 1825, and an inertial measurement unit (IMU) 1830. The electronic display block 1815 may display images to the user in accordance with data received from the console 1810. In some embodiments, the electronic display block 1815 may include an electronic display and an optics block. The electronic display may generate image light. In some embodiments, the electronic display may include a single electronic display or multiple electronic displays (e.g., a display for each eye of a user). Examples of the electronic display may include: a liquid crystal display (LCD), an organic light emitting diode (OLED) display, an active-matrix organic light-emitting diode display (AMOLED), a transparent organic light emitting diode display (TOLED), some other display, a projector, or a combination thereof.

The optics block may include combinations of different optical elements. An optical element may be an aperture, a Fresnel lens, a convex lens, a concave lens, a filter, or any other suitable optical element that affects the image light emitted from the electronic display. In some embodiments, one or more of the optical elements in the optics block may have one or more coatings, such as anti-reflective coatings. Magnification of the image light by the optics block may allow elements of the electronic display to be physically smaller, weigh less, and consume less power than larger displays. Additionally, magnification may increase a field of view of the displayed media. For example, the field of view of the displayed media may be widened, such that the displayed media may be presented using almost all (e.g., 110 degrees diagonal), and in some cases all, of the user's field of view. In some embodiments, the optics block may be designed to have an effective focal length larger than the spacing to the electronic display, thereby magnifying the image light projected by the electronic display. Additionally, in some embodiments, the amount of magnification may be adjusted by adding or removing optical elements.

The pancake lens assembly 1817 may be any one of the disclosed pancake lens assembly which is achromatic due to the compensation of the PBP LC lens. In some embodiments, the pancake lens assembly 1817 may be configured as a monolithic pancake lens assembly without any air gaps between optical elements of the pancake lens assembly. The pancake lens assembly 1817 may also magnify received light from the electronic display, correct optical aberrations associated with the image light, and the corrected image light may be presented to a user of the HMD 1805.

The locators 1820 may be objects located at various positions on the HMD 1805 relative to one another and relative to a specific reference point on the HMD 1805. A locator 1820 may be a light emitting diode (LED), a corner cube reflector, a reflective marker, a type of light source that contrasts with an environment in which the HMD 1805 operates, or a combination thereof. In some embodiments, when the locators 1820 may be active (i.e., an LED or other type of light-emitting device) elements, the locators 1820 may emit light in the visible band (about 380 nm to about 1850 nm), in the infrared (IR) band (about 1850 nm to about 1 mm), in the ultraviolet band (about 10 nm to about 380 nm), another portion of the electromagnetic spectrum, or a combination thereof.

In some embodiments, the locators 1820 may be located beneath an outer surface of the HMD 1805, which can be transparent to the wavelengths of light emitted or reflected by the locators 1820 or can be thin enough to not substantially attenuate the wavelengths of light emitted or reflected by the locators 1820. In some embodiments, the outer surface or other portions of the HMD 1805 may be opaque in the visible band of wavelengths of light. Thus, the locators 1820 may emit light in the IR band under an outer surface that may be transparent in the IR band but opaque in the visible band.

The IMU 1830 may be an electronic device that generates fast calibration data based on measurement signals received from one or more of the position sensors 1825. A position sensor 1825 may generates one or more measurement signals in response to motion of the HMD 1805. Examples of position sensors 1825 may include: one or more accelerometers, one or more gyroscopes, one or more magnetometers, another suitable type of sensor that detects motion, a type of sensor used for error correction of the IMU 1830, or one or more combinations thereof. The position sensors 1825 may be located external to the IMU 1830, internal to the IMU 1830, or a combination thereof.

Based on the one or more measurement signals from one or more position sensors 1825, the IMU 1830 may generates fast calibration data indicating an estimated position of the HMD 1805 relative to an initial position of the HMD 1805. For example, the position sensors 1825 may include multiple accelerometers to measure translational motion (forward/back, up/down, left/right) and multiple gyroscopes to measure rotational motion (e.g., pitch, yaw, roll). In some embodiments, the IMU 1830 may rapidly samples the measurement signals and calculates the estimated position of the HMD 1805 from the sampled data. For example, the IMU 1830 may integrate the measurement signals received from the accelerometers over time to estimate a velocity vector and integrates the velocity vector over time to determine an estimated position of a reference point on the HMD 1805. In some embodiments, the IMU 1830 may provide the sampled measurement signals to the console 1810, which determines the fast calibration data. The reference point may be a point that may be used to describe the position of the HMD 1805. While the reference point may generally be defined as a point in space; however, in practice the reference point may be defined as a point within the HMD 1805 (e.g., a center of the IMU 1830).

The IMU 1830 may receive one or more calibration parameters from the console 1810. As further discussed below, the one or more calibration parameters may be used to maintain tracking of the HMD 1805. Based on a received calibration parameter, the IMU 1830 may adjust one or more IMU parameters (e.g., sample rate). In some embodiments, certain calibration parameters may cause the IMU 1830 to update an initial position of the reference point, so it corresponds to a next calibrated position of the reference point. Updating the initial position of the reference point as the next calibrated position of the reference point may help reduce accumulated error associated with the determined estimated position. The accumulated error, also referred to as drift error, may cause the estimated position of the reference point to "drift" away from the actual position of the reference point over time.

The imaging device 1835 may generate slow calibration data in accordance with calibration parameters received from the console 1810. Slow calibration data may include one or more images showing observed positions of the locators 1820 that may be detectable by the imaging device

1835. The imaging device 1835 may include one or more cameras, one or more video cameras, any other device capable of capturing images including one or more of the locators 1820, or some combination thereof. Additionally, the imaging device 1835 may include one or more filters (e.g., used to increase signal to noise ratio). The imaging device 1835 may be configured to detect light emitted or reflected from locators 1820 in a field of view of the imaging device 1835.

In some embodiments, when the locators 1820 include passive elements (e.g., a retroreflector), the imaging device 1835 may include a light source that illuminates some or all of the locators 1820, which retro-reflect the light towards the light source in the imaging device 1835. Slow calibration data may be communicated from the imaging device 1835 to the console 1810, and the imaging device 183 may receive one or more calibration parameters from the console 1810 to adjust one or more imaging parameters (e.g., focal length, focus, frame rate, ISO, sensor temperature, shutter speed, aperture, etc.).

The input interface 1840 may be a device that allows a user to send action requests to the console 1810. An action request may be a request to perform a particular action. For example, an action request may be to start or end an application or to perform a particular action within the application. The input interface 1840 may include one or more input devices. Example input devices may include: a keyboard, a mouse, a game controller, or any other suitable device for receiving action requests and communicating the received action requests to the console 1810. An action request received by the input interface 1840 may be communicated to the console 1810, which performs an action corresponding to the action request. In some embodiments, the input interface 1840 may provide haptic feedback to the user in accordance with instructions received from the console 1810. For example, haptic feedback may be provided when an action request may be received, or the console 1810 may communicate instructions to the input interface 1840 causing the input interface 1840 to generate haptic feedback when the console 1810 performs an action.

The console 1810 may provide media to the HMD 1805 for presentation to the user in accordance with information received from one or more of: the imaging device 1835, the HMD 1805, and the input interface 1840. In some embodiments, as shown in FIG. 18, the console 1810 may include an application store 1845, a tracking module 1850, and a virtual reality (VR) engine 1855. In some embodiments, the console 1810 may include modules different from those described in conjunction with FIG. 18. Similarly, the functions further described below may be distributed among components of the console 1810 in a different manner than may be described here.

The application store 1845 may store one or more applications for execution by the console 1810. An application may be a group of instructions, that when executed by a processor, may generate content for presentation to the user. Content generated by an application may be in response to inputs received from the user via movement of the HMD 1805 or the input interface 1840. Examples of applications may include gaming applications, conferencing applications, video playback application, or other suitable applications.

The tracking module 1850 may calibrate the system 1800 using one or more calibration parameters and may adjust one or more calibration parameters to reduce error in determination of the position of the HMD 1805. For example, the tracking module 1850 may adjust the focus of the imaging device 1835 to obtain a more accurate position for observed locators on the HMD 1805. Moreover, calibration performed by the tracking module 1850 may also account for information received from the IMU 1830. Additionally, when tracking of the HMD 1805 may be lost (e.g., the imaging device 1835 loses line of sight of at least a threshold number of the locators 1820), the tracking module 1850 may re-calibrate some or all of the system environment 1800.

The tracking module 1850 may track movements of the HMD 1805 using slow calibration information from the imaging device 1835. The tracking module 1850 may determine positions of a reference point of the HMD 1805 using observed locators from the slow calibration information and a model of the HMD 1805. The tracking module 1850 may also determine positions of a reference point of the HMD 1805 using position information from the fast calibration information. Additionally, in some embodiments, the tracking module 1850 may use portions of the fast calibration information, the slow calibration information, or some combination thereof, to predict a future location of the HMD 1805. The tracking module 1850 may provide the estimated or predicted future position of the HMD 1805 to the engine 1855.

The engine 1855 may execute applications within the system environment 1800 and receives position information, acceleration information, velocity information, predicted future positions, or some combination thereof of the HMD 1805 from the tracking module 1850. Based on the received information, the engine 1855 may determine content to provide to the HMD 1805 for presentation to the user. For example, when the received information indicates that the user has looked to the left, the engine 1855 may generate content for the HMD 1805 that mirrors the user's movement in a virtual environment. Additionally, the engine 1855 may perform an action within an application executing on the console 1810 in response to an action request received from the input interface 1840, and provide feedback to the user that the action was performed. The provided feedback may be visual or audible feedback via the HMD 1805 or haptic feedback via the input interface 1840.

Figure 19A:
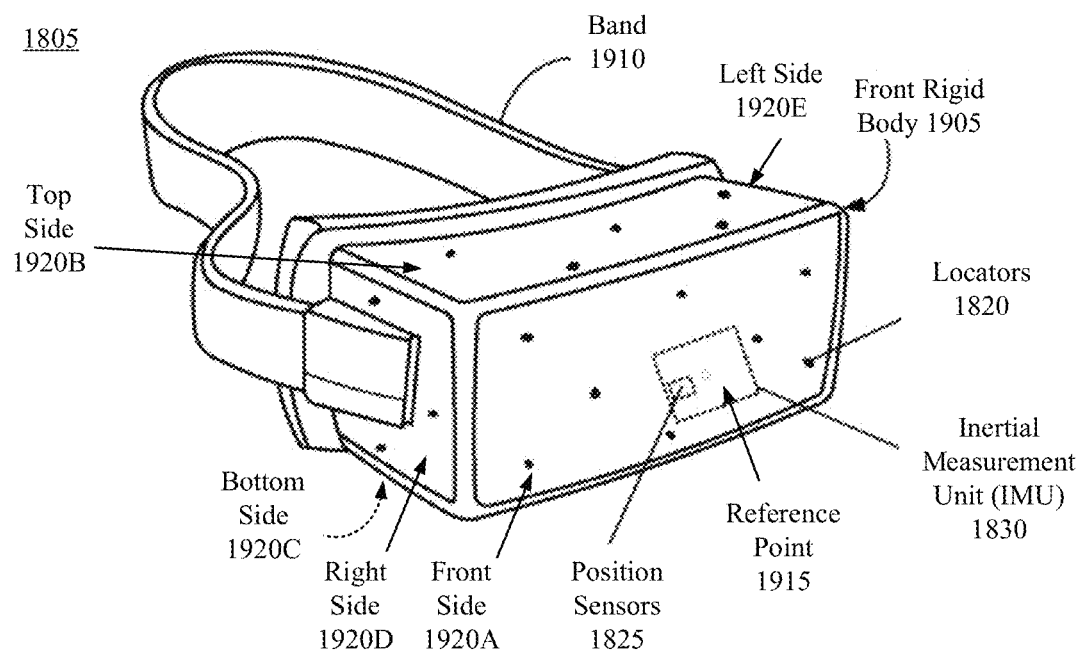
FIG. 19A illustrates a schematic diagram of a head mounted display (HMD) shown in FIG. 18.

FIG. 19A illustrates a schematic diagram of the HMD 1805 in FIG. 18. Referring to FIG. 19A and FIG. 18, the HMD 1805 may include a front rigid body 1905 and a band 1910. The front rigid body 1905 may include one or more electronic display elements of the electronic display and optics block (not shown in FIG. 19A), the IMU 1830, the one or more position sensors 1825, and the locators 1820. In the embodiment shown in FIG. 19A, the position sensors 1825 may be located within the IMU 1830, and neither the IMU 1830 nor the position sensors 1825 may be visible to the user.

The locators 1820 may be located at fixed positions on the front rigid body 1905 relative to one another and relative to a reference point 1915. In the embodiment shown in FIG. 19A, the reference point 1915 may be located at the center of the IMU 1830. Each of the locators 1820 may emit light that may be detectable by the imaging device 1835. The locators 1820, or some of the locators 1820, may be located on a front side 1920A, a top side 1920B, a bottom side 1920C, a right side 1920D, and a left side 1920E of the front rigid body 1905.

Figure 19B:
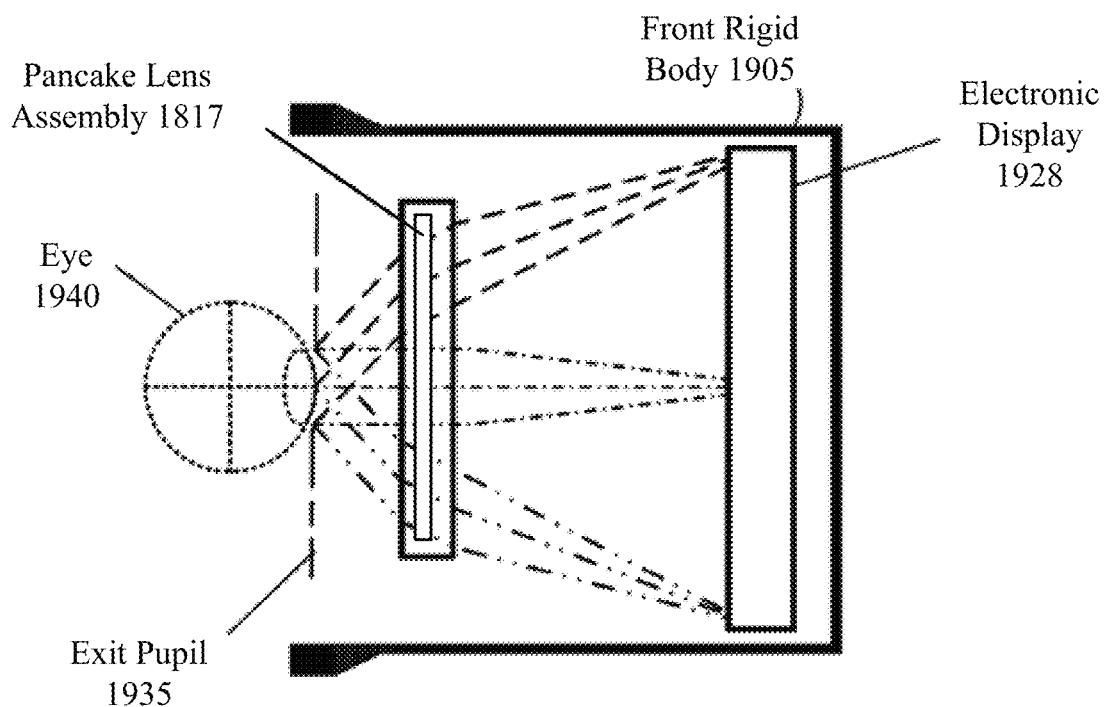
FIG. 19B illustrates a schematic diagram of a front rigid body of the HMD shown in FIG. 18A.

FIG. 19B illustrates a schematic diagram of the front rigid body 1905 of the HMD 1805 shown in FIG. 19A. As shown in FIG. 19B, the front rigid body 1905 may include an electronic display 1928 and the pancake lens assembly 1817 that provides altered image light to an exit pupil 1935. The exit pupil 1935 may be at a location of the front rigid body 1905 where a user's eye 1940 may be positioned. For illustrative purposes, FIG. 19B shows a cross-section of the front rigid body 1905 associated with a single eye 1940, while another electronic display, separate from the electronic display 1928, can provide image light altered by the optics block to another eye of the user.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical lens assembly, comprising:
   a first optical element including a partial reflector and a quarter-wave plate;
   a second optical element including a reflective polarizer; and
   a varifocal lens disposed between the first optical element and the second optical element, the varifocal lens including a liquid crystal (LC) lens stack formed by a plurality of LC lenses, an LC lens of the plurality of the LC lenses having a plurality of optical states including an additive state that increases an optical power of the varifocal lens and a subtractive state that reduces the optical power of the varifocal lens,
   wherein the quarter-wave plate is disposed between the partial reflector and the reflective polarizer, and the varifocal lens is disposed between the quarter-wave plate and the reflective polarizer, and
   wherein the varifocal lens provides an adjustment of an overall optical power for the optical lens assembly.

2. The optical lens assembly according to claim 1, wherein the LC lens of the plurality of the LC lenses includes a neutral state that does not affect the overall optical power of the optical lens assembly.

3. The optical lens assembly according to claim 1, wherein the LC lens stack further comprises a plurality of switchable half-wave plates (SHWPs) arranged in optical series with the plurality of LC lenses, and the LC lens of the plurality of the LC lenses is directly adjacent to at least one SHWP of the plurality of SHWPs.

4. The optical lens assembly according to claim 3, wherein a circularly polarized light output from the at least one SHWP is received by the LC lens of the plurality of the LC lenses.

5. The optical lens assembly according to claim 2, wherein the LC lens stack further comprises a plurality of switchable half-wave plates (SHWPs) arranged in optical series with the plurality of LC lenses, and the LC lens of the plurality of the LC lenses is directly adjacent to at least one SHWP of the plurality of SHWPs.

6. The optical lens assembly according to claim 5, wherein a circularly polarized light output from the at least one SHWP is received by the LC lens of the plurality of the LC lenses.

7. The optical lens assembly according to claim 1, wherein the LC lens of the plurality of the LC lenses is a Pancharatnam Berry Phase (PBP) LC lens.

8. The optical lens assembly according to claim 1, wherein the optical lens assembly is a component of a head-mounted display (HMD).

9. A head-mounted display (HMD), comprising:
   an optical lens assembly configured to receive an image light from an electronic display and direct the image light to an eye-box, the optical lens assembly comprising:
   a first optical element including a partial reflector and a quarter-wave plate;
   a second optical element including a reflective polarizer; and
   a varifocal lens disposed between the first optical element and the second optical element, the varifocal lens including a liquid crystal (LC) lens stack formed by a plurality of LC lenses, an LC lens of the plurality of the LC lenses having a plurality of optical states including an additive state that increases an optical power of the varifocal lens and a subtractive state that reduces the optical power of the varifocal lens, wherein the quarter-wave plate is disposed between the partial reflector and the reflective polarizer, and the varifocal lens is disposed between the quarter-wave plate and the reflective polarizer, and wherein the varifocal lens provides an adjustment of an overall optical power for the optical lens assembly.

10. The HMD according to claim 9, wherein the LC lens of the plurality of the LC lenses includes a neutral state that does not affect the overall optical power of the optical lens assembly.

11. The HMD according to claim 9, wherein the LC lens stack further comprises a plurality of switchable half-wave plates (SHWPs) arranged in optical series with the plurality of LC lenses, and the LC lens of the plurality of the LC lenses is directly adjacent to at least one SHWP of the plurality of SHWPs.

12. The HMD according to claim 11, wherein a circularly polarized light output from the at least one SHWP is received by the LC lens of the plurality of the LC lenses.

13. The HMD according to claim 10, wherein the LC lens stack further comprises a plurality of switchable half-wave plates (SHWPs) arranged in optical series with the plurality of LC lenses, and the LC lens of the plurality of the LC lenses is directly adjacent to at least one SHWP of the plurality of SHWPs.

14. The HMD according to claim 13, wherein a circularly polarized light output from the at least one SHWP is received by the LC lens of the plurality of the LC lenses.

15. The HMD according to claim 9, wherein the LC lens of the plurality of the LC lenses is a Pancharatnam Berry Phase (PBP) LC lens.

* * * * *